United States Patent [19]
Goto et al.

[11] Patent Number: 5,047,976
[45] Date of Patent: Sep. 10, 1991

[54] LOGIC CIRCUIT HAVING CARRY SELECT ADDERS

[75] Inventors: Gensuke Goto, Ebina; Hajime Kubosawa, Machida, both of Japan

[73] Assignee: Fujitsu Limited, Kawasaki, Japan

[21] Appl. No.: 658,467

[22] Filed: Feb. 22, 1991

Related U.S. Application Data

[63] Continuation of Ser. No. 329,241, Mar. 27, 1989.
[51] Int. Cl.$^5$ .............................................. G06F 7/50
[52] U.S. Cl. ................................................. 364/788
[58] Field of Search ............................... 364/784-788

[56] References Cited

U.S. PATENT DOCUMENTS 4,675,838  6/1987  Mazin et al. .................... 364/788

FOREIGN PATENT DOCUMENTS 147754  4/1982  Japan .
105041  7/1985  Japan .
226836  3/1986  Japan .
221822 10/1986  Japan .
 75840  1/1987  Japan .

OTHER PUBLICATIONS

E. C. Dunn et al., "Arithmetic Unit Using Table Look-Up", IBM Technical Disclosure Bulletin, vol. 12, No. 11, Apr. 1970, pp. 1800-1801.

R. B. Anderson, "Five-Level Combinations Sum Predict & Carry Propagate Adder", IBM Technical Disclosure Bulletin, vol. 14, No. 1, Jun. 1971, pp. 112-113.

Primary Examiner—David L. Clark
Assistant Examiner—Long T. Nguyen
Attorney, Agent, or Firm—Staas & Halsey

[57] ABSTRACT

An operation circuit for M-bits parallel full addition includes partitioned adders and first and second multiplexers. Each of the first multiplexers selects one of paired provisional carry signals $C_{ns-1}(1)$ and $C_{ns-1}(0)$ supplied from the s-th partitioned adder, depending on the value of the real carry signal $C_{(s-1)n-1}$ supplied from the (s-1)th partitioned adder, the selected one of the provisional carry signals being the real carry signal $C_{ns-1}$ to be progatatd from the s-th partitioned adder. Each of the second multiplexers generates a pair of provisional carry signals $Ck^*(1)$ and $Ck^*(0)$ $(k=n(s+1)-1, n(s+2)-1, \ldots, n(s+l)-1)$ by referring to paired provisional carry signals $Cr(1)$ (or $Cr^*(1)$; $r=k-n=ns-1$) and $Cr(0)$ (or $Cr^*(0)$; $k-n=ns-1$) which are lower by n digits than the ones to be generated. Then the second multiplexers generate l real carry signals Ck at the same time by selecting either the provisional carry signal $Ck^*(1)$ or $Ck^*(0)$, depending on the real carry signal $C_{(s-1)n-1}$ relating to a digit which is one digit lower than the lowest-order digit of the s-th partitioned adder.

21 Claims, 31 Drawing Sheets

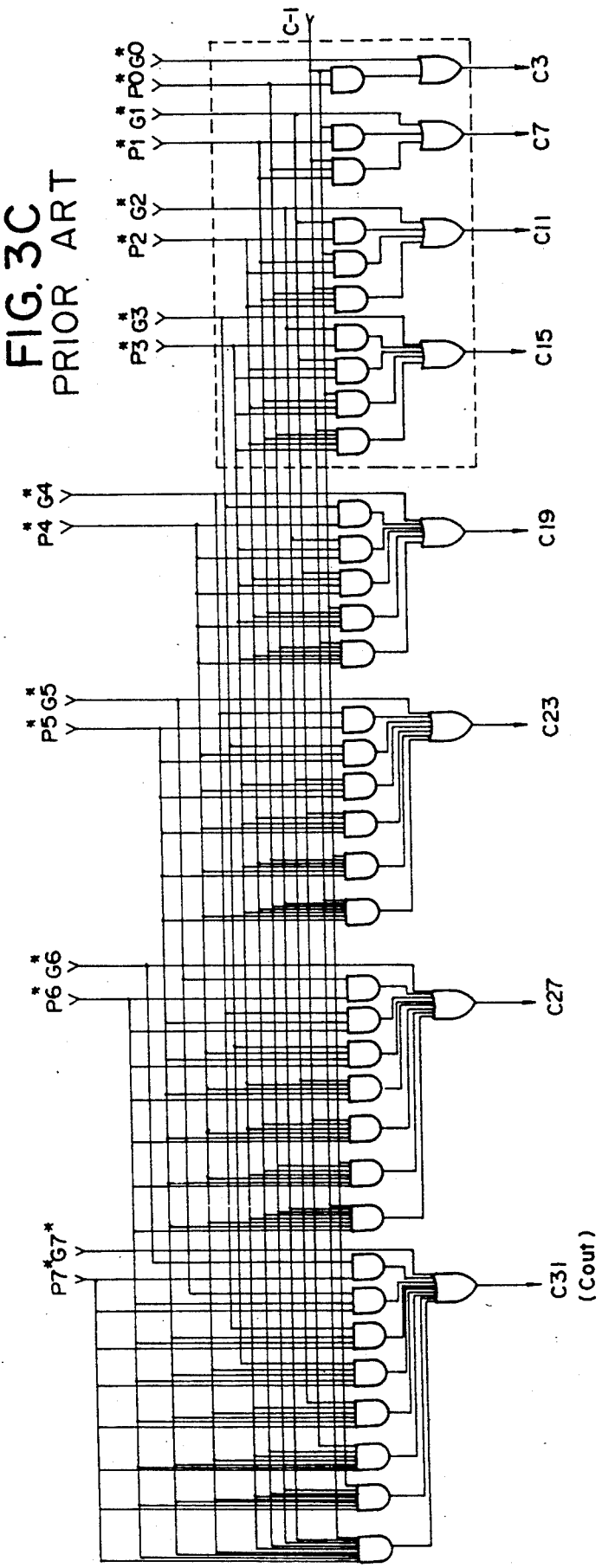

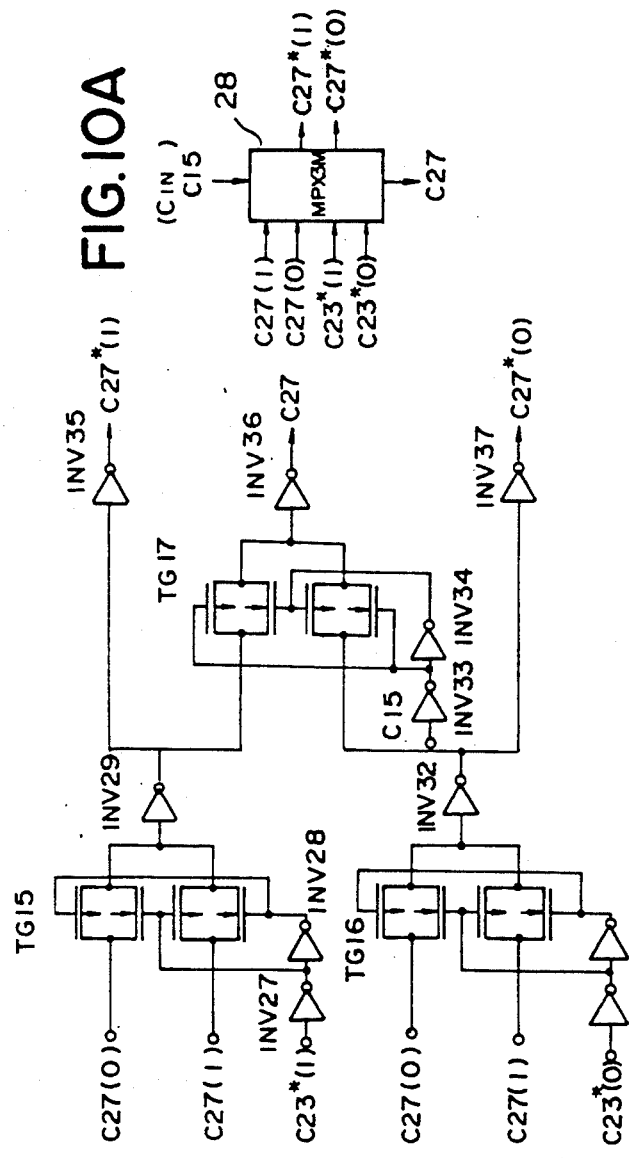
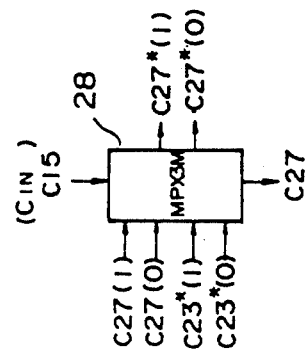
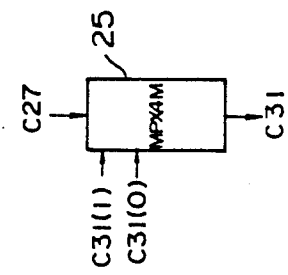
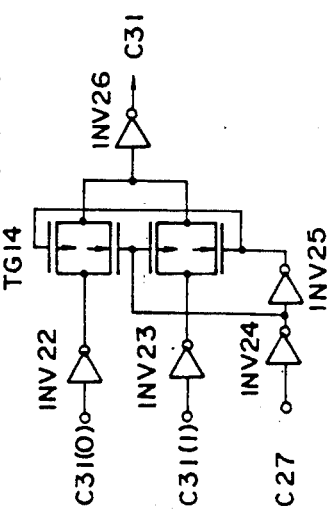

ic circuit having carry select adders, and more particularly to a logic circuit including two-stage carry select adders capable of processing multiple bits such as 32, 64 and 80 bits in parallel at the same time.

LOGIC CIRCUIT HAVING CARRY SELECT ADDERS

This application is a continuation of application Ser. No. 329,241, filed Mar. 27, 1989, now abandoned.

BACKGROUND OF THE INVENTION

The present invention generally relates to a logic circuit having carry select adders, and more particularly to a logic circuit including two-stage carry select adders capable of processing multiple bits such as 32, 64 and 80 bits in parallel at the same time.

In conventional multiple bit parallel full adders, each of two integers to be processed is divided into a plurality of units each consisting of a predetermined number of digits. Then, adding operation is made between the corresponding units, and the operation results obtained for every unit are combined. This operation procedure is intended to enhance the operation speed.

A carry select adder is known as a multiple bit parallel full adder. FIG. 1 shows a conventional 16-bit carry select adder (see Japanese Laid-Open Patent Application No. 61-221822 or 61-226836). Referring to this figure, the illustrated 16-bit carry select adder includes four 4-bit-length partitioned adders CSA, four sets of two-input multiplexers MPX, and four carry selectors CS. A and B are binary numbers each represented with M digits, where binary numbers A and B are an augend and an addend, respectively, in obtaining the arithmetic sum. Each of the binary numbers A and B has an amount of information corresponding to 16 bits when $M=16$. Each of the 16-bit binary numbers A and B is divided into four portions (hereafter, each portion is referred to as a partitioned bit set), A3-A0, B3-B0, A15-A12, B15-B12, which are supplied to the corresponding 4-bit partitioned adders CSA. Each bit contained in each of the partitioned bit sets assumes '0' or '1'.

$C_{-1}$ is a real carry signal supplied from the digit immediately below the lowest-order digit out of 16 digits. $C3^0$, $C7^0$, $C11^0$ and $C15^0$ are carry signals which are propagated to higher-order digits when the real carry signal $C_{-1}$ is '0'. $C3^1$, $C7^1$, $C11^1$ and $C15^1$ are carry signals which are propagated to higher-order digits when the real carry signal $C_{-1}$ is '1'. S0-S15 form a sum output signal S ($=A+B$).

FIGS. 2A through 2C are views of a conventional Manchester type carry adder. FIG. 2A shows a 32-bit full adder, which includes positive/negative logic blocks A and B each including a full adder amounting to 4 bits. FIG. 2B shows a carry bypass circuit used in the logic block of FIG. 2A. The illustrated carry bypass circuit includes inverters and transfer gates TG, and outputs a carry signal Cj by bypassing, for every four bits, a real carry signal $C_{IN}$ supplied from the lower-order digit. Transfer gates may be constituted by complementary metal oxide semiconductor (CMOS) transistors each having a gate length equal to or less than 1.5 [μm].

FIG. 2C illustrates a positive logic full adder out of 4-bit full adders used in the logic block of FIG. 2A. When a combination of input data Ai and Bi (Ai, Bi) is (0, 1) or (1, 0), the full adder is kept in a waiting state where it waits for the supply of the real carry signal $C_{i-1}$ propagated from the lower-order bit. In the case where all the four combinations of Ai and Bi are (0, 1) or (1, 0) in the 4-bit full adder, by bypassing the real carry signal $C_{IN}$ through the bypass circuit of FIG. 2B, it becomes possible to shorten a critical path where the real carry signal ($Cj = C_{IN}$) is propagated through all the transfer gates amounting to 4 bits. In addition, bypass circuits BP1 and BP2 (FIG. 2A) are provided for two 12-bit portions, each of which consists of three blocks each having 4 bits as a unit. Thereby, it is possible to propagate the carry signal Cj at high speeds.

FIGS. 3A through 3C illustrate a conventional 32-bit two-stage carry look ahead adder, which is also known as one of the multiple bit parallel full adders. Referring to FIG. 3A, a block labeled ULB is a carry propagate/generate unit, and a block labeled BCLA is a 4-bit-length block carry look ahead unit. The illustrated adder also includes 8-bit-length carry look ahead (CLA) units 2, and a 32-bit-length sum unit 3. Each of the binary numbers A and B is represented with 32 digits such that $A = A0-A31$ and $B = B0-B31$. Pi ($=P0-P31$) is a carry propagate signal, and Gi ($=G0-G31$) is a carry generate signal. The carry propagate signal Pi is defined as $Pi = Ai \oplus Bi$, and the carry generate signal Gi is defined as $Gi = Ai \cdot Bi$. Si ($=S0-S31$) is a digit of the sum output signal ($S = A + B$).

FIG. 3B shows the structure of the 4-bit-length block carry look ahead unit BCLA with respect to a unit consisting of the zeroth bit to the third bit. As shown, the block carry look ahead unit BCLA includes logic gates such as AND gates, OR gates, and receives carry propagate signals P0-P3 for the zeroth bit (digit) to third bit (digit), carry generate signals G0-G3 for the zeroth bit to the third bit, and the real carry signal $C_{-1}$ propagated from the digit which is one digit lower than the lowest-order digit of the illustrated block. Then the carry look ahead unit BCLA generates, from these input signals, a block look ahead carry propagate signal P0*, a block look ahead carry generate signal G0*, and real carry signals C0, C1, and C2.

FIG. 3C shows the structure of the 8-bit-length CLA unit. The illustrated CLA unit receives block look ahead carry propagate signals P0* to P7* relating to the zeroth to seventh bits, the block look ahead carry generate signals G0*-G7* relating to the zeroth to seventh bits, and the real carry signal $C_{-1}$ propagated from the digit which is one digit lower than the lowest-order digit of the illustrated CLA unit. Then the CLA unit generates, from these input signals, real carry signals C3, C7, C11, ..., C27 and C31 for every four digits. The CLA unit is made up of 2 to 9-input AND gates (or NAND gates), and 2 to 9-input OR gates (or NOR gates). In an actual circuit configuration of the CLA unit, a logic gate having 5 inputs or over, such as a 9-input AND gate is configured with combination of gates having smaller numbers of inputs. For example, a 9-input AND gate is constructed with four 3-input AND gates (or three 3-input NAND gates and one 3-input NOR gate).

The aforementioned carry select adder needs an extremely large number of structural elements with an increase of digits to be processed at a time, because the carry selectors CS must contain a more-than-linearly increased number of elements with the increase of processing digits. Furthermore, the adder needs to contain more elements than twice that of the ripple carry adder, to generate two sets of signals Si(1), Si(0) and the real sum signal Si. Additionally, the conventional carry select adder causes a considerabley large delay in processing time.

The aforementioned Manchester type carry adder may be constructed by a small number of structural elements, as compared with the carry select adder. However, there are the following disadvantages. As described previously, this type includes transfer gates directly cascaded by four stages or over, each of which is constituted by CMOS transistors. In this case, a signal waveform becomes dull, which arises from series resistance of CMOS transistors as well as junction capacitance between source and drain thereof. For these reasons, the processing speed is not so high. As a result, a large amount of power is consumed irrespective of a reduced number of structural elements.

The aforementioned 32-bit two-stage carry look ahead adder needs a large number of logic gates, which leads to an increase in time taken to propagate the carry signal. Additionally, the processing speed decreases with an increase of the fan-in number. Further, it takes extremely long to obtain the operation result for the following reason. That is, the carry signals C0–C31 relating to all the digits are propagated through BCLA→CLA→BCLA after the carry generate signals Gi and the carry propagate signals Pi are applied to the circuit. Thereafter, the signal processing by the 32-bit-length sum unit 3 is carried out, and then the sum output signal Si (=S0–S31) is obtained.

An improvement on carry signal processing has been proposed in Japanese Laid-Open Patent Application No. 57-147754. The proposed improvement is illustrated in FIG. 4. The illustrated improvement is a 44-bit adder. The feature of the improvement is that the number of digits to be processed in partitioned adders CSAi (i=1 to 8) increases towards higher-order digits, or in other words, increases with an increase of 'i'. For example, the partitioned adder CSA1 consists of a single adder AD to which digits A0 and B0 are supplied, and the carry select adder CSA8 consists of 8 adders to which corresponding digits A36, B36 through A43, B43 are supplied.

The carry signals $C0^1$ and $C0^0$ are output from the partitioned adder CSA1 with a delay time of 1D after the carry propagate and generate signals Pi and Gi are generated. 'D' is a unit delay time taken for a signal to pass through a transfer gate. In this way, the carry signals are output from the partitioned adder CSAi with a delay time of iD. The real carry signal C0 is determined with a total delay time of 2D. That is, the carry signals $C0^1$ and $C0^0$ are calculated beforehand with respect to the case where the real carry signal $C_{IN}$ is '1' which is supplied from the digit which is one digit lower than the lowest-order digit, and the case where the real carry signal $C_{IN}$ is '0'. It takes a delay time of 1D to carry out this calculation. Then, a multiplexer MPX5 relating to the zeroth digit selects one of the carry signals $C0^1$ and $C0^0$ on the basis of the value ('1' or '0') of the real carry signal $C_{IN}$. A delay time of 1D is needed for this selection. As a result, the total delay time is 2D to obtain the real carry signal C0 relating to the zeroth digit. The real carry signal C0 thus obtained is supplied to a multiplexer MPX5 associated with the partitioned adder CSA2. The carry signals $C2^1$ and $C2^0$ are output from the partitioned adder CSA2 with a total delay time of 2D. At this time, the real carry signal C0 is determined as described previously. Therefore, the multiplexer MPX5 associated with the partitioned adder CSA2 selects either the carry signal $C2^1$ or $C2^0$ on the basis of the value of the real carry signal C0. In this way, the carry signal is sequentially determined. It takes a delay time of 10D to obtain the real carry signal C43 relating to the highest-order digit. This delay time corresponds to a total time taken to obtain the summation result.

The above-mentioned improvement presents a relatively high-speed. However, as the number of digits to be processed increases, a time taken to obtain the operation result increases drastically.

SUMMARY OF THE INVENTION

It is therefore a general object of the present invention to provide a novel and useful logic circuit having carry select adders in which the aforementioned disadvantages are eliminated.

A more specific object of the present invention is to provide a logic circuit having carry select adders capable of outputting the operation result at higher speeds.

Another object of the present invention is to provide a logic circuit having carry select adders which can operate rapidly even when the number of digits to be processed is increased.

The above objects of the present invention can be achieved by an operation circuit comprising N partitioned adders provided for every n bits (n<M; N≧M/n), each generating a pair of provisional carry signals $C_{ns-1}(1)$ and $C_{ns-1}(0)$ relating to the s-th partitioned adder from the partitioned adder relating to the lowest-order digit, and generating real sum signals Fj amounting to n bits, the paired provisional carry signals being calculated supposing a first case where the carry of a lower-order digit is '1' and a second case where the carry of the digit is '0'; and means for generating real carry signals Ck and $C_{ns-1}$ relating to the partitioned adders. The above means comprises first means and second means. The first means selects one of paired provisional carry signals $C_{ns-1}(1)$ and $C_{ns-1}(0)$ supplied from the s-th partitioned adder, depending on the value of the real carry signal $C_{(s-1)n-1}$ supplied from the (s-1)th partitioned adder. The selected one of the provisional carry signals is the real carry signal $C_{ns-1}$ to be propagated from the s-th partitioned adder. The second means generates a pair of provisional carry signals $Ck^*(1)$ and $Ck^*(0)$ (k=n(s+1)−1, n(s+2)−1, . . . , n(s+l)−1) by referring to paired provisional carry signals Cr(1) (or $Cr^*(1)$; r=k−n=ns−1) and Cr(0) (or $Cr^*(0)$; r=k−n=ns−1) which are lower by n digits than the ones to be generated. The second means generates l real carry signals Ck at the same time by selecting either the provisional carry signal $Ck^*(1)$ or $Ck^*(0)$, depending on the real carry signal $C_{(s-1)n-1}$ relating to a digit which is one digit lower than the lowest-order digit of the s-th partitioned adder.

The above objects of the present invention can also be achieved by an operation circuit for M-bit parallel full addition, comprising N partitioned adders provided for every n bits (n<M; N≧M/n), each generating a pair of provisional carry signals $C_{ns-1}(1)$ and $C_{ns-1}(0)$ relating to the s-th partitioned adder from the partitioned adder relating to the lowest-order digit, and generating a pair of provisional sum signals Fj(1) and Fj(0) each amounting to n bits, the paired provisional carry signals and the paired provisional sum signals being calculated supposing a first case where the carry of a lower-order digit is '1' and a second case where the carry of the digit is '0'; and means for generating real carry signals Ck and $C_{ns-1}$, and real sum signals Fj relating to the partitioned adders. The above means comprises first means and second means. The first means selects one of paired provisional carry signals $C_{ns-1}(1)$ and $C_{ns-1}(0)$ and selecting one of paired provisional sum signals $Fj(1)$ and $Fj(0)$ supplied from the s-th partitioned adder, depending on the value of the real carry signal $C_{(s-1)n-1}$ supplied from the (s-1)th partitioned adder, the selected one of the provisional carry signals being the real carry signal $C_{ns-1}$ to be propagated from the s-th partitioned adder, the selected one of the provisional sum signals being the real sum signal amounting to n bits relating to the s-th partitioned adder. The second means generates a pair of provisional carry signals $Ck^*(1)$ and $Ck^*(0)$ $(k=n(s+1)-1, n(s+2)-1, \ldots, n(s+l)-1)$ by referring to paired provisional carry signals $Cr(1)$ (or $Cr^*(1)$; $r=k-n=ns-1$) and $Cr(0)$ (or $Cr^*(0)$; $r=k-n=ns-1$) which are lower by n digits than the ones to be generated, and for generating l real carry signals Ck, and real sum signals Fj amounting to nl digits at the same time by selecting either the provisional carry signal $Ck^*(1)$ or $Ck^*(0)$. Then the second means selects either the provisional sum signals $Fj(1)$ or $Fj(0)$, depending on the real carry signal $C_{(s-1)n-1}$ relating to a digit which is one digit lower than the lowest-order digit of the s-th partitioned adder.

The above-mentioned objects of the present invention can also be achieved by an operation circuit for M-bit parallel full addition, comprising N partitioned adders each processing a corresponding number of bits, generating a pair of block look ahead carry propagate signals BPi and block look ahead carry generate signals BGi, and generating a pair of provisional sum signals $Fj(1)$ and $Fj(0)$ supposing a first case where the carry of a lower-order digit is '1' and a second case where the carry of the digit is '0'; a plurality of first means each for selecting either one of the paired provisional sum signals $Fj(1)$ and $Fj(0)$, thereby producing a real sum signal Fj; a plurality of second means each for generating a pair of provisional carry signals $Cj(1)$ and $Cj(0)$ supposing a first case where the carry of a lower-order digit is '1' and a second case where the carry of the digit is '0'; a plurality of third means each for generating inverted real carry signals XCj for each of the blocks each including a corresponding number of bits by selecting one of the paired provisional carry signals, the inverted real carry signals XCj being supplied to the first means and used for the selecting operation of the corresponding first means, the inverted real carry signal of the highest-order digit in each of the inverted real carry signals being propagated to one of the plurality of third means which is positioned at a higher-order digit.

Other objects, features, and advantages of the present invention will become apparent from the following detailed description when read in conjunction with the accompanying drawings.

BRIEF DESCRIPTION OF THE DRAWINGS

FIGS. 3A, 3B, 3C are views illustrating a conventional 32-bit-length two-stage carry look ahead adder;

FIGS. 9A and 9B are vies illustrating a first multiplexer used in the embodiment of FIG. 5;

FIG. 10A and 10B are views illustrating a second multiplexer used in the embodiment of FIG. 5

DESCRIPTION OF THE PREFERRED EMBODIMENTS

A description is given of a first preferred embodiment of the present invention.

Figure 5:
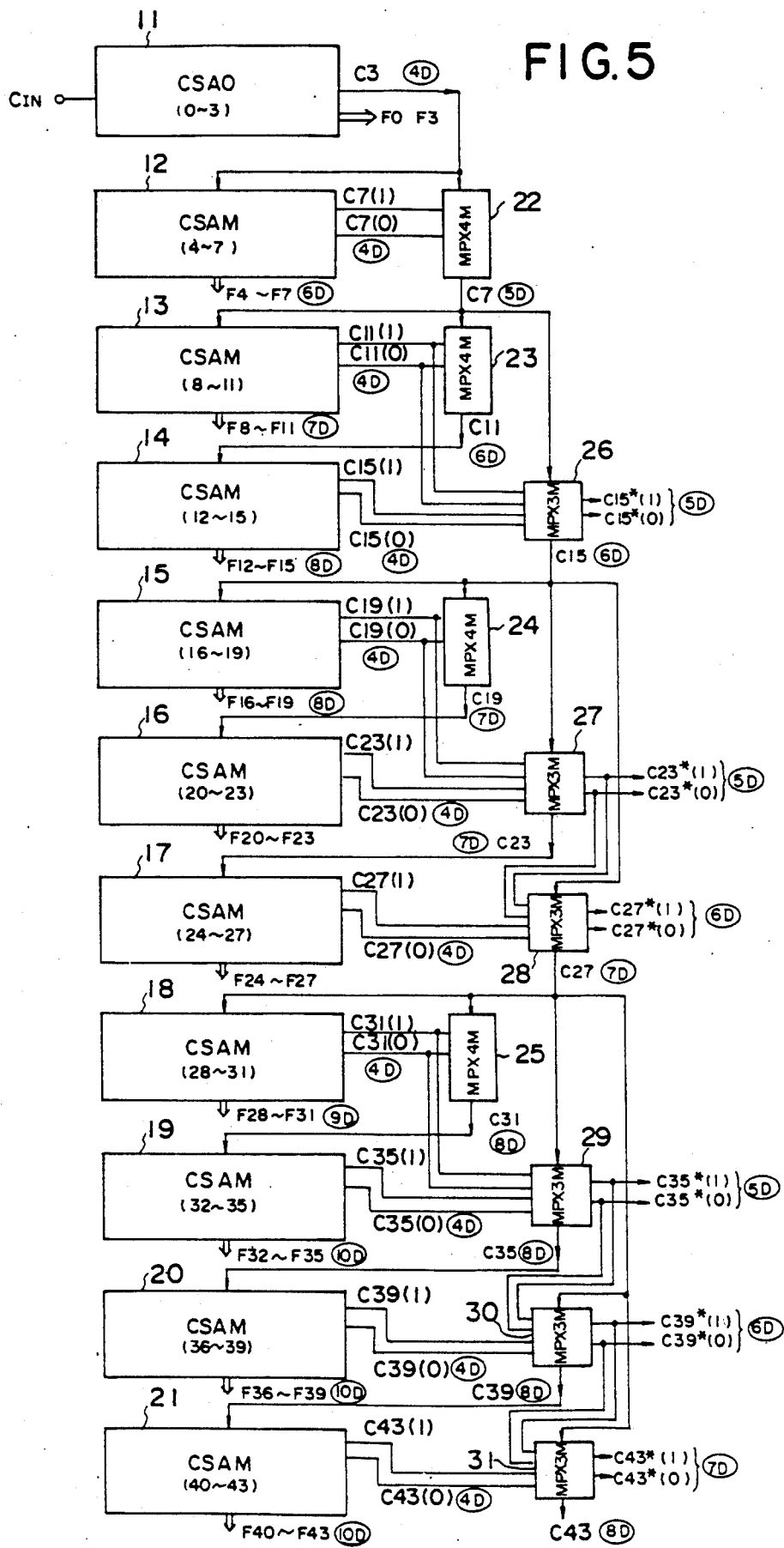
FIG. 5 is a block diagram of a first preferred embodiment of the present invention.

FIG. 5 is a block diagram of a first preferred embodiment of the present invention. The first embodiment is a 44-bit adder and includes partitioned carry adders 11 through 21 labeled CSAM, first multiplexers 22 through 25 labeled MPX4M, and second multiplexers 26 through 31 labeled MPX3M.

Each of the partitioned adders 11 through 21 is a 4-bit-length partitioned adder. The partitioned adder 11 is labeled CSA0, and the remaining partitioned adders 12 through 21 are labeled CSAM. The carry signal $C_{IN}$ propagated from the digit which is one digit lower than the lowest-order digit, is supplied to the carry select adder 11, which outputs the real carry signal C3 and real sum signals F0 through F3 relating to the partitioned adder 11. The real carry signal C3 is supplied to the multiplexer 22 and the partitioned adder 12. It is noted that it takes a delay time of 4D to obtain the real carry signal C3.

The partitioned adder 12 outputs carry signals $C7(1)$ and $C7(0)$ with a delay time of 4D. Signals $Cj(1)$ and $Cj(0)$ (j=0–43) are provisional carry signals, which are then subjected to selection based on the value of the real carry signal propagated from a lower-order digit, and is then propagated to higher-order digits. The provisional carry signal C7(1) is a carry signal obtained when the real carry signal C3 is assumed to be '1', and the provisional carry signal C7(0) is a carry signal obtained when the real carry signal C3 is assumed to be '0'. The provisional carry signals C7(1) and C7(0) are supplied to the multiplexer 22, which selects one of the provisional carry signals C7(1) and C7(0) on the basis of the value of the real carry signal C3. Since it takes a delay time of 1D to make such selection, the real carry signal C7 is determined with a total delay time of 5D. On the other hand, real sum signals F4 through F7 relating to the fourth digit to the seventh digit, are output from the partitioned adder 12 with a total delay time of 6D. That is, it takes a delay time of 2D to obtain the real sum signals F4 through F7 after the real carry signal C3 is supplied thereto. The real carry signal C7 is supplied to the multiplexer 23 and the partitioned adder 13. It is noted that the real carry signal C7 is also supplied to the multiplexer 26.

The multiplexer 23 operates in the same way as the multiplexer 22. The partitioned adder 13 operates in the same way as the partitioned adder 12, and outputs provisional carry signals C11(1) and C11(0) with a total delay time of 4D. The partitioned adder 13 also generates real sum signals F8 through F11 with a total delay time of 7D. The multiplexer 23 selects one of the provisional carry signals C11(1) and C11(0) on the basis of the value of the real carry signal C7 supplied from the multiplexer 22. The provisional carry signal selected by the multiplexer 23 is the real carry signal C11, and is supplied to the partitioned adder 13.

It is noted that the provisional carry signals C11(1) and C11(0) are also supplied (propagated) to the multiplexer 26, to which supplied are provisional carry signals C15(1) and C15(0) derived from the partitioned adder 14 with a delay time of 4D. This is intended to calculate candidates for the value of real carry signal C15 to be propagated upwards by using the provisional carry signals C11(1) and C11(0) supplied from the partitioned adder 13 before the real carry signal C11 is determined, and to immediately determine the value of the real carry signal C15 when the real carry signal C7 propagated from the partitioned adder 12 is determined.

The multiplexer 26 generates a pair of provisional signals C15*(1) and C15*(0) with a total delay time of 5D by using the above-mentioned provisional carry signals. It is noted that Cj*(1) and Cj*(0) are provisional signals generated by the multiplexers. It is noted that it takes a total delay time of 5D to obtain the provisional carry signals C15*(1) and C15*(0). Therefore, the multiplexer 26 determines the real carry signal C15 with a total delay time of 6D on the basis of the value of the real carry select signal C7.

The real carry signal C15 is supplied to the partitioned adder 15, and the multiplexers 24, 27 and 28. The partitioned adder 15 operates in the same way as the partitioned adders 12, 13 and 14, and the multiplexer 24 operates in the same way as the multiplexers 22 and 23. The multiplexer 27 is supplied with provisional carry signals C19(1) and C19(0) supplied from the partitioned adder 15, and provisional carry signals C23(1) and C23(0) supplied from the partitioned adder 16. Then the multiplexer 27 generates a pair of provisional carry signals C23*(1) and C23*(0) from the supplied selected carry signals C19(1), C19(0), C23(1) and C23(0). It takes a total delay of 5D to obtain a pair of provisional carry signals C23*(1) and C23*(0). Then, the multiplexer 27 determines the real carry signal C23 with a total delay time of 7D on the basis of the value of the real carry signal C15 which is generated with a total delay time of 6D.

It is noted that the provisional carry signals C23*(1) and C23*(0) generated by the multiplexer 27 are supplied to the multiplexer 28. This means that the provisional carry signals C19(1) and C19(0) are provisionally propagated up to the twenty-seventh digit. Then the multiplexer 28 generates a pair of provisional carry signals C27*(1) and C27*(0) from the provisional carry signals C23*(1) and C23*(0) supplied from the multiplexer 27 and the provisional carry signals C27(1) and C27(0) supplied from the partitioned adder 17. It takes a total delay time of 6D to obtain the provisional carry select signals C27*(1) and C27*(0). This is because it takes a total delay time of 5D to obtain the provisional carry signals C23*(1) and C23*(0), and it takes a delay time of 1D to generate (select) the provisional select signals C27*(1) and C27*(0) after the provisional carry signals C23*(1) and C23*(0) are generated. Then the multiplexer 28 determines the real carry signal C27 when the real carry signal C15 is supplied thereto. It takes a delay time 1D to make this determination (selection). The real carry signal C27 thus determined is supplied to the partitioned adder 18, the multiplexers 25, 29, 30 and 31. It should be appreciated that when the real carry signal C15 is determined, the real carry signals C19, C23 and C27 are immediately determined.

The multiplexer 25, 29 and 30 operate in the same way as the aforementioned multiplexers 24, 27 and 28, respectively. The multiplexer 29 generates a pair of provisional carry signals C35*(1) and C35*(0) from provisional carry signals C31(1) and C31(0) supplied from the partitioned adder 18, and provisional carry signals C35(1) and C35(0) supplied from the partitioned adder 19. Then, the real carry signal C35 is determined by the multiplexer 29 with a total delay time of 8D. The provisional carry select signals C35*(1) and C35*(0) are supplied to the multiplexer 30, to which provisional carry signals C39(1) and C39(0) are supplied from the partitioned adder 20. Then the multiplexer 30 generates a pair of provisional carry signals C39*(1) and C39*(0), depending on the value of the input carry signals C35*(1), C35*(0), C39(1) and C39(0). Then, the multiplexer 30 determines the real carry signal C39 on the basis of the value of the real carry signal C27. It takes a total time of 8D to obtain the real carry signal C39. The provisional carry signals C39*(1) and C39*(0) are supplied to the multiplexer 31, to which provisional carry signals C43(1) and C43(0) are supplied. Then the multiplexer 31 generates a pair of provisional carry signals C43*(1) and C43*(0) from the input carry signals C39*(1), C39*(0), C43(1) and C43(0). The provisional carry signals C43*(1) and C43*(0) are not propagated upwards in the embodiment. Then, the real carry signal C43 is determined with a total delay time of 8D on the basis of the value of the real carry signal C27 supplied from the multiplexer 28.

The above-mentioned operation with respect to the multiplexers (MPX4M) can be described in the general form as follows. Partitioned adders are arranged for every n bits. A pair of provisional carry signals $C_{ns-1}(1)$ and $C_{ns-1}(0)$ (also represented as $Ck*(1)$ and $Ck*(0)$) is made propagated to higher-order digits by m digits ($m = nl$; l is a positive integer), before real carry signal $C_{(s-1)n-1}$ propagated from the digit which is one digit lower than the lowest order digit in the s-th partitioned adder which is positioned upwards by s from the partitioned adder relating to the lowest-order digit, reaches the s-th partitioned adder. Thereby, a pair of provisional carry signals Ck*(1) and Ck*(0) (k=n(s+1)−1, n(s+2)−1, ..., n(s+l)−1) is generated. Thereafter, when the real carry signal C$_{(s-1)n-1}$ relating to the digit which is one digit lower than the s-th partitioned adder, is determined, l+1 real carry signals Ck, C$_{ns-1}$ are selected and determined at the same time.

Figure 1:
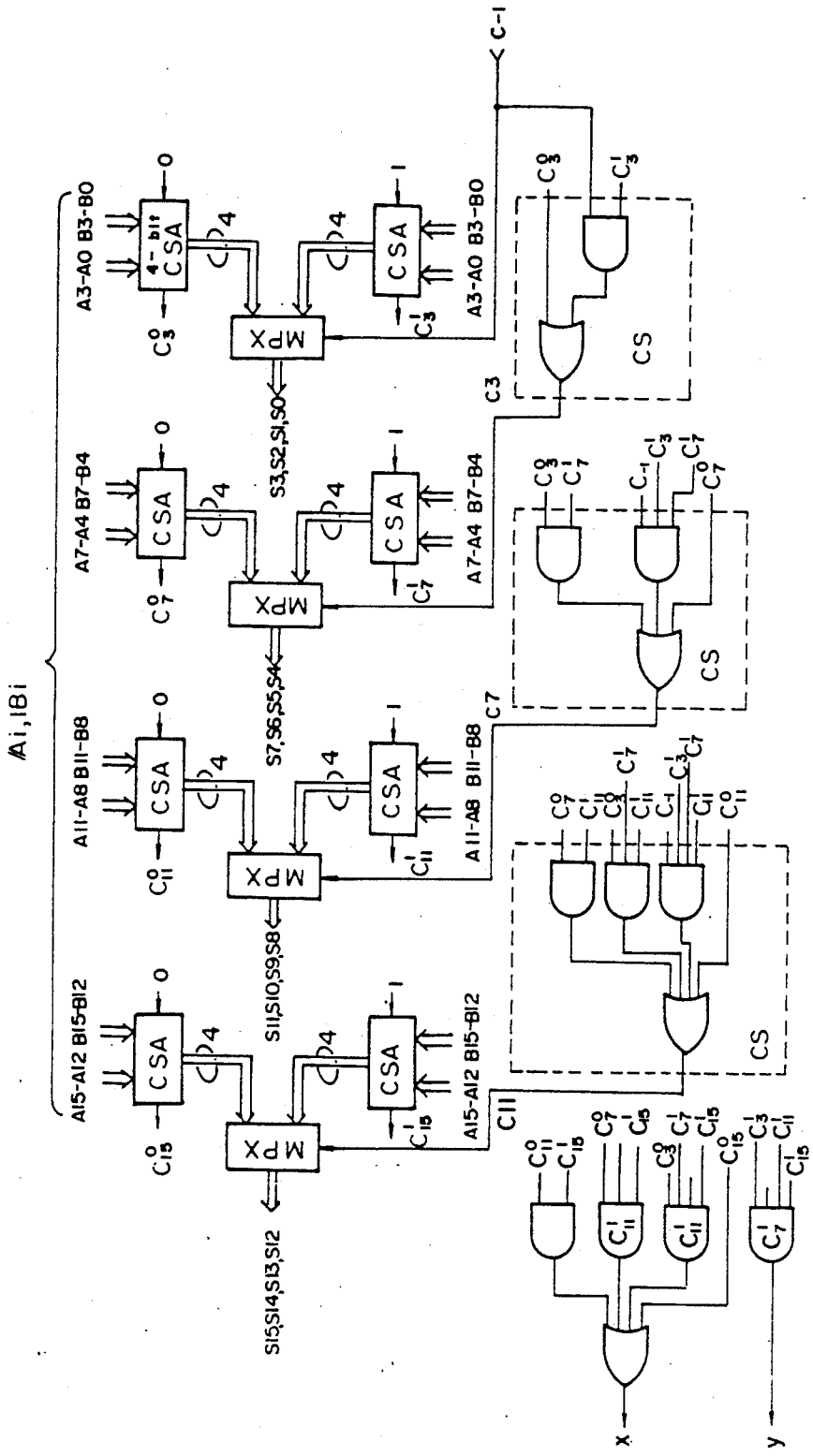
FIG. 1 is a block diagram of a conventional 16-bit carry select adder.
Figure 2A:
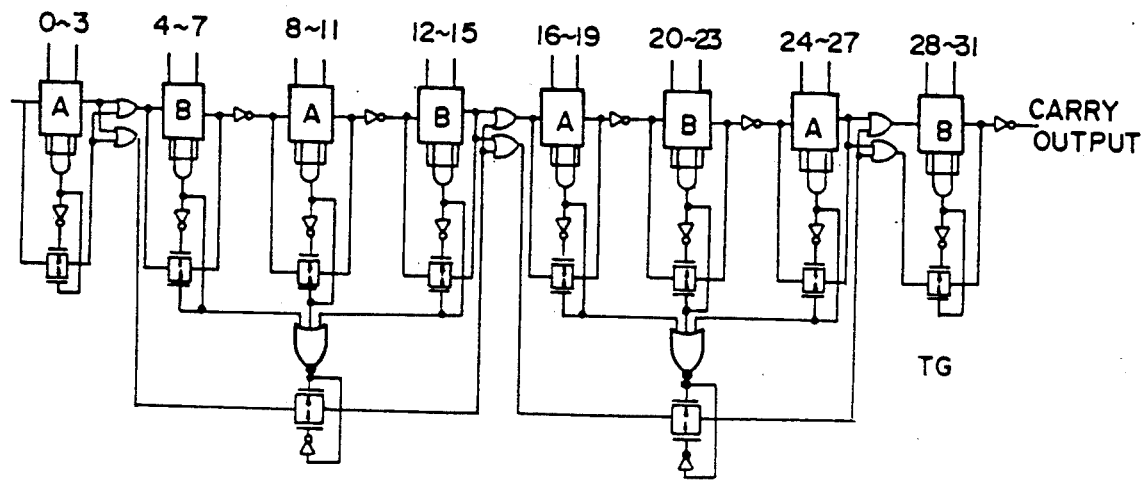
FIGS. 2A, 2B, 2C are views illustrating a conventional Manchester type carry adder.
Figure 2B:
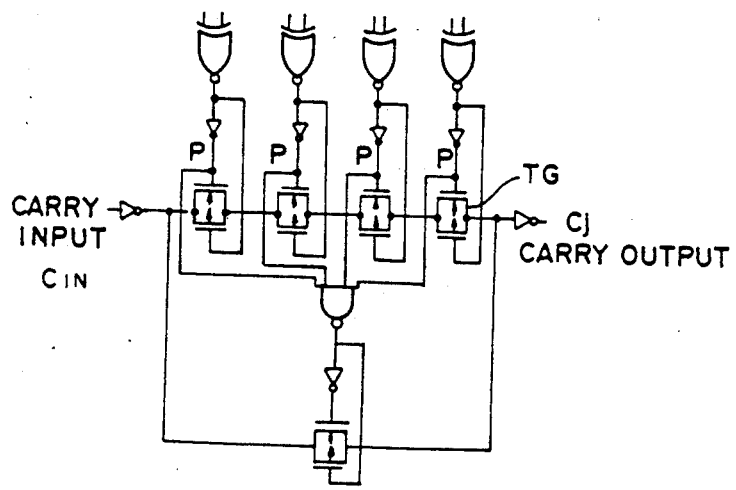
Figure 2C:
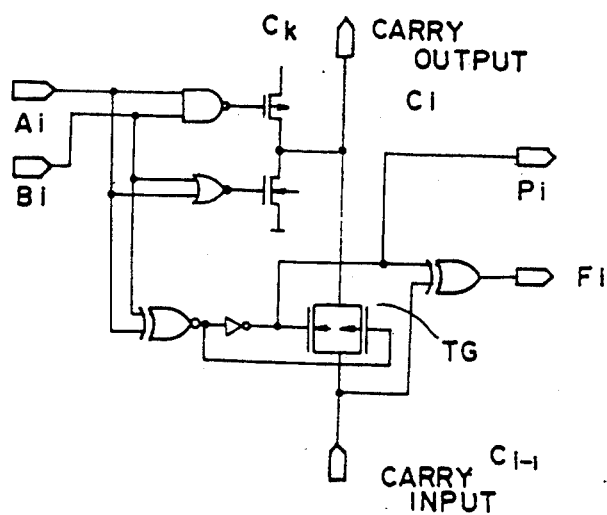
Figure 3A:
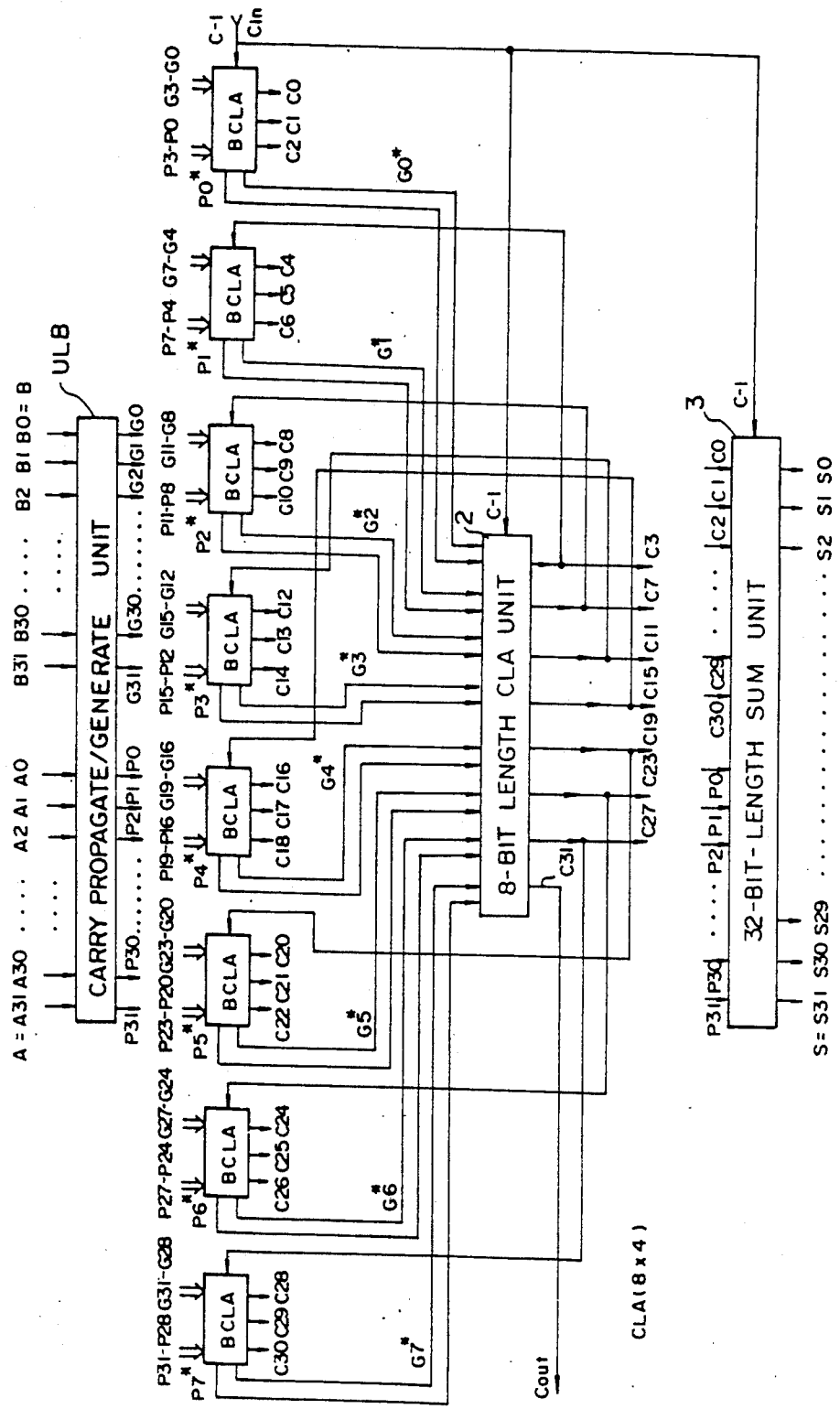
Figure 3B:
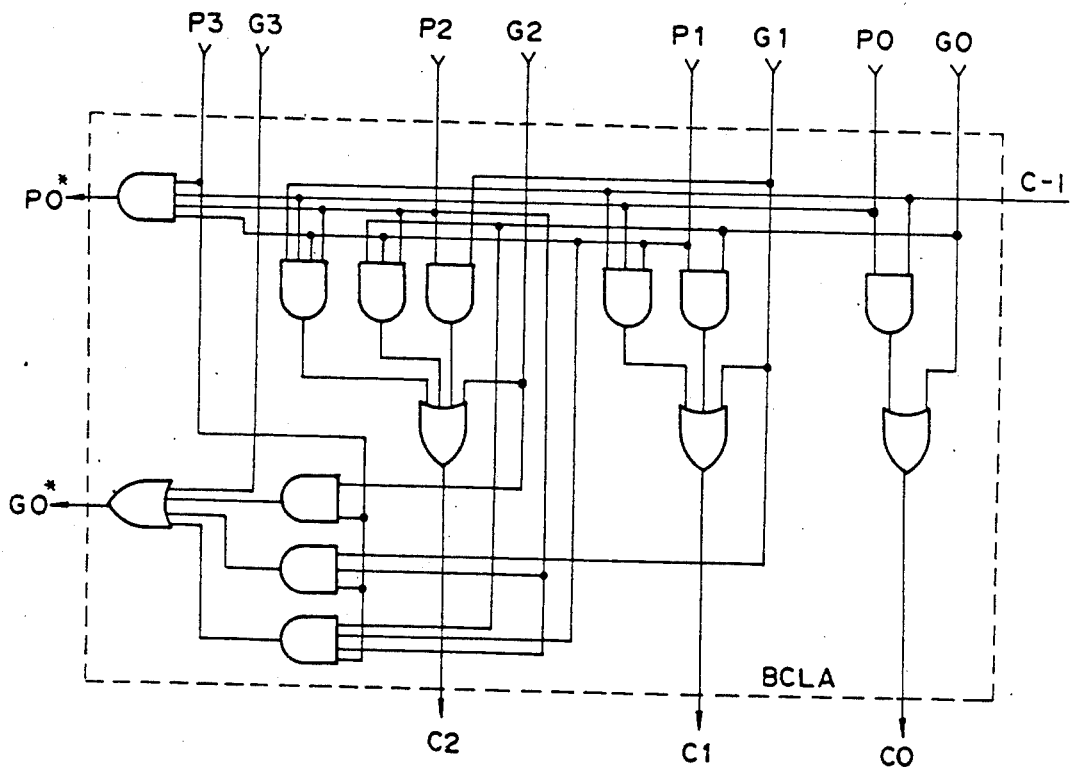
Figure 4:
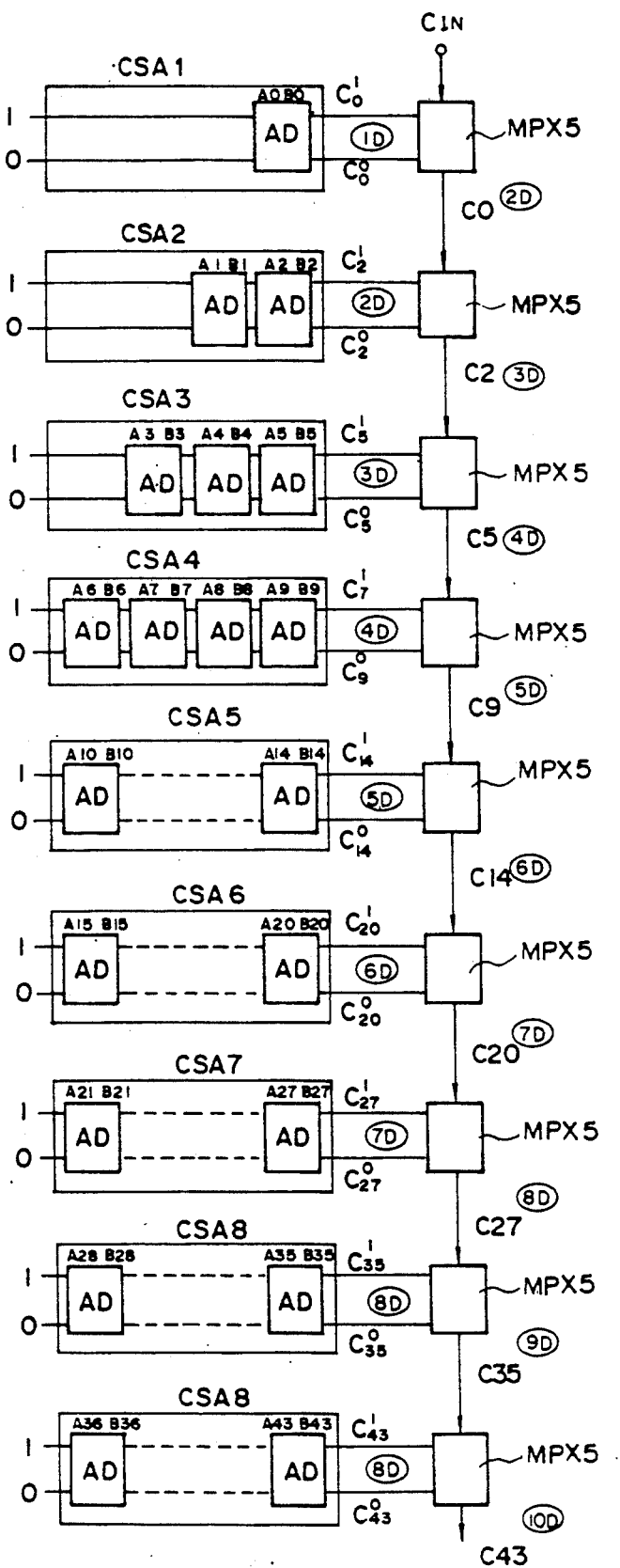
FIG. 4 is a block diagram of still another example of conventional multiple bit parallel full adders.

Table 1 shows the relationship between the highest digit to be processed (MSB; the most significant bit) and corresponding delay time of the sum signal associated with MSB, obtained by conventional adder of FIG. 4 and the first embodiment of the present invention.

TABLE 1

| Embodiment | | Prior Art | |
|---|---|---|---|
| MSB | Delay time | MSB | Delay time |
| 4–7 | 6D | 6–9 | 6D |
| 8–11 | 7D | 10–14 | 7D |
| 12–19 | 8D | 15–20 | 8D |
| 20–31 | 9D | 21–27 | 9D |
| 32–47 | 10D | 28–35 | 10D |
| 48–67 | 11D | 36–44 | 11D |
| 68–91 | 12D | 45–54 | 12D |
| 92–119 | 13D | 55–65 | 13D |
| 120–151 | 14D | 66–77 | 14D |
| | | 78–90 | 15D |
| | | 91–104 | 16D |
| | | 105–119 | 17D |
| | | 120–135 | 18D |
| | | 136–152 | 19D |

Figure 6A:
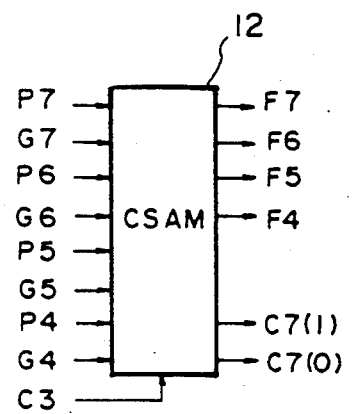
FIGS. 6A and 6B are views illustrating a partitioned adder used in the embodiment of FIG. 5.
Figure 6B:
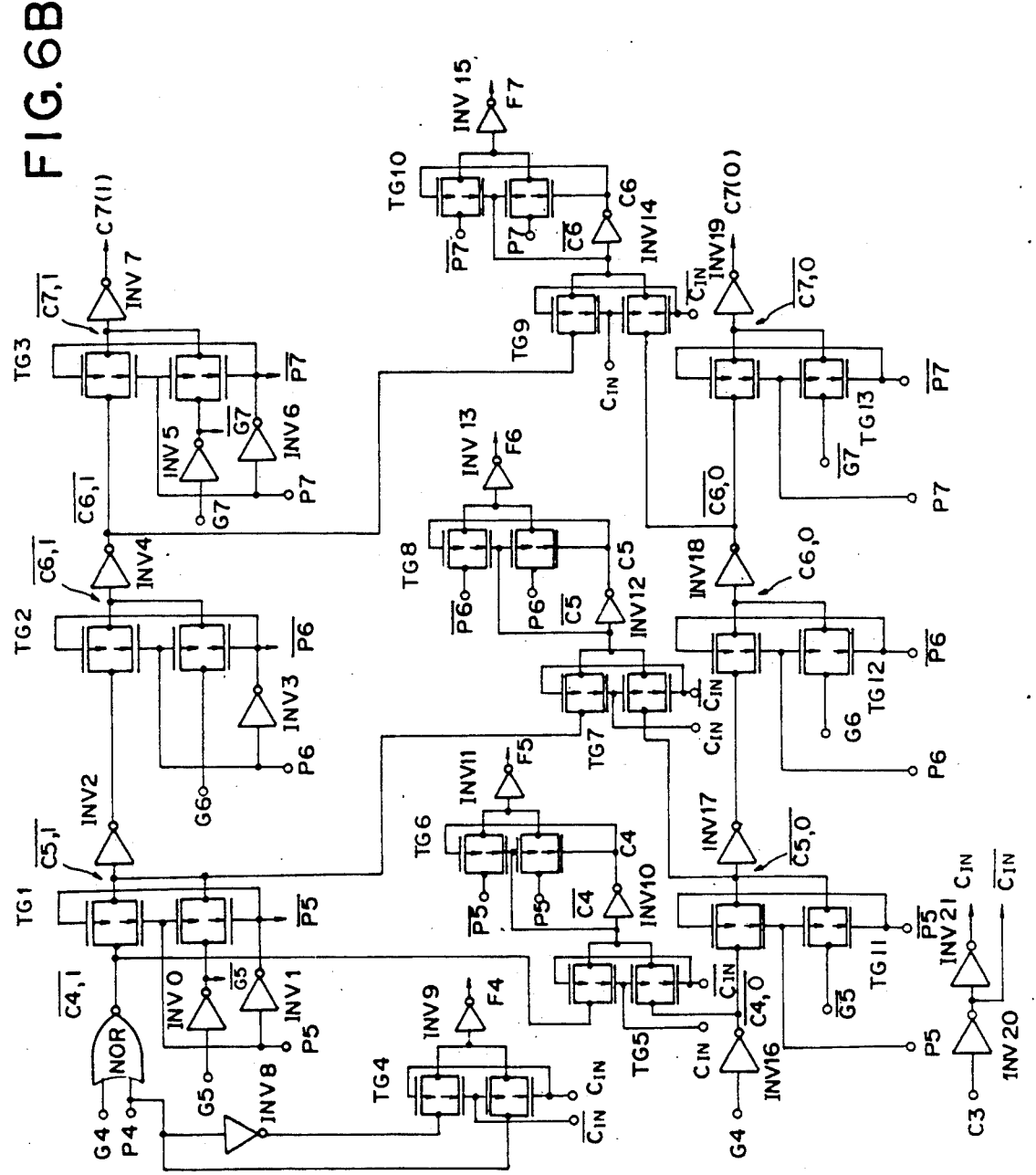

A description is given of the structure for the partitioned adder 12 with reference to FIGS. 6A and 6B. The description about the structure of FIGS. 6A and 6B holds true for the other partitioned adders 13 through 21.

Referring to FIG. 6A, the partitioned adder 12 receives the carry propagate signals P4 through P7 relating to the fourth digit through the seventh digit, the carry generate signals G4 through G7 relating thereto, and the real carry signal C3 supplied from the partitioned adder 11, and then generates the real sum signals F4 through F7, and the provisional carry signals C7(1) and C7(0). The carry propagate signal P4 through P7 are defined by a formula that Pj=Aj⊕Bj (j=4 to 7 in this case). The carry generate signals G4 through G7 are defined by a formula such that Gj=Aj·Bj (j=4 to 7 in this case). Signals $\overline{P4}$ through $\overline{P7}$ are inverted carry propagate signals obtained by inverting the carry propagate signals P4 through P7. Signals $\overline{G4}$ through $\overline{G7}$ are inverted carry generate signals obtained by inverting the carry generate signals G4 through G7. Signals Cj,1 and Cj,0 are carry signals which are generated by and propagated from a chain of a transfer gate and inverter relating to a digit which is one bit lower than each digit. Signals $\overline{Cj,1}$ and $\overline{Cj,0}$ are inverted carry signals which are generated by and propagated from a chain of a transfer gate and inverter relating to a digit which is one bit lower than each digit.

Figure 7A:
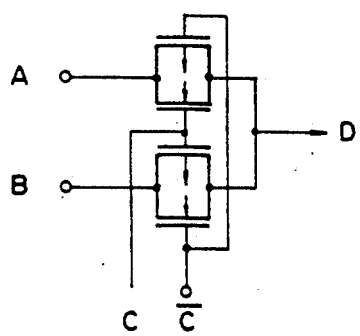
FIGS. 7A and 7B are views illustrating a selector including transfer gates used in the embodiment of FIG. 5.
Figure 7B:
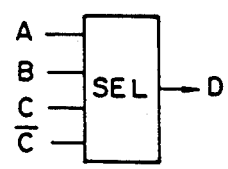

The partitioned adder 12 includes transfer gates TG1 through TG13 and inverters INV0 through INV21 associated therewith. Each of the transfer gates TG1 through TG13 consists of a pair of transfer gates, and functions as a selector as shown in FIGS. 7A and 7B. Hereafter, a transfer gate TGi (i=1, 2, ...) means a selector consisting of a pair of transfer gates. The outputs of the pair of transfer gates forms a wired-OR. The selector SEL selects one of the two inputs A and B, depending on the value of the control signal C. When C=1, the output D is equal to A, and on the other hand, when C=0 the output D is equal to B. The transfer gates TG1 through TG3 and related inverters INV0 through INV7 form a circuit portion, which generates the provisional carry signal C7(1) to be propagated to the multiplexer 22 (FIG. 5). It is noted that a carry signal Cj is obtained by the following formula: Cj=Cj+Cj−1⊕Pj.

Figure 8:
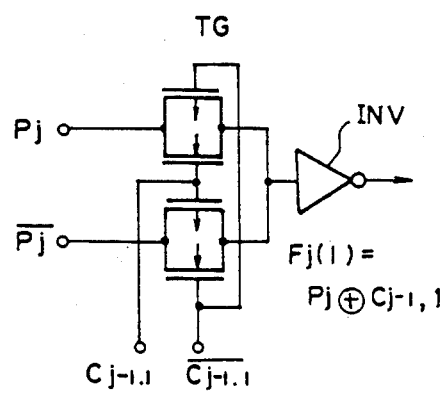
FIGS. 8 is a circuit diagram illustrating a chain of transfer gates and an inverter.

The transfer gates TG4 through TG10 and related inverters INV8 through INV15 form a circuit portion, which generates the real sum signals F4 through F7. As shown in FIG. 8, the combination of a transfer gate TG and an inverter INV forms an exclusive-OR circuit. That is, a real sum signal Fj is represented as follows: Fj(1)=Pj⊕Cj−1,1. For example, the real sum signal F4 is generated by the transfer gate TG4 and the inverter INV9. The transfer gate TG4 is supplied with the carry propagate signal P4 and inverted carry propagate signal $\overline{P4}$, and is controlled by the real carry signal C$_{IN}$ and inverted signal $\overline{C_{IN}}$. The inverted real carry signal $\overline{C_{IN}}$ is a signal obtained by inverting the real carry signal C3 through the inverter INV20, and the real carry signal C$_{IN}$ is a signal obtained by inverting the inverted real carry signal $\overline{C_{IN}}$ through the inverter 21. The real sum signal F5 is generated by the combination of the transfer gates TG5 and TG6 and the inverters INV10 and INV11. The transfer gate TG5 is supplied with the carry signals C$_{IN}$ and the inverted carry signal $\overline{C_{IN}}$. The transfer gate TG5 selects one of the inverted carry signal $\overline{C4,1}$ supplied from an NOR gate NOR and the inverted carry signal $\overline{C4,0}$ supplied from the inverter INV16. A selected carry signal $\overline{C4}$ is supplied to a connection point of the transfer gate TG6, and also control terminals thereof through the inverter INV10. The transfer gate TG6 selects either the carry propagate signal P5 or the inverted carry propagate signal $\overline{P5}$. It can be seen from the above that the real sum signal F5 is determined with a delay time of 2D necessary for selection in the transfer gates TG5 and TG6 after the real carry signal C3 is determined. The selected signal passes through the inverter INV11, the output of which is the real sum signal F5. The real sum signals F6 and F7 are generated in the same way as the real sum signal F5.

The transfer gates TG11 through TG13 and related inverters INV16 through INV19 form a circuit portion, which generates the provisional carry signal C7(0) which is to be supplied to the multiplexer 22 (FIG. 5). The above-mentioned structure of the partitioned adder 12 is applied to each of the other partitioned adders 13 through 21.

FIGS. 9A and 9B show an example of the structure for the multiplexer (MPX4M) 25 relating to the partitioned adder 18. The illustrated structure may be applied to each of the multiplexers of the same type 22 through 24. The multiplexer 25 selects one of the provisional carry signals C31(1) and C31(0) supplied from the partitioned adder 18, depending on the value of the real carry signal C27 supplied from the multiplexer 28. As shown in FIG. 9B, the multiplexer 25 is made up of a transfer gate TG14 and inverters INV22 through INV 26.

FIG. 10A and 10B show an example of the structure for the multiplexer (MPX3M) 28 relating to the partitioned adder 17. The illustrated structure may be applied to each of the multiplexers of the same type 26, 27, 29, 30 and 31. The multiplexer 28 has a first circuit portion, which is provided with respect to each of the provisional carry signals C23*(1) and C23*(0), and functions to select either the provisional carry signal C27(0) or C27(1) beforehand by referring to values of '1' and '0' of the provisional carry signals C23*(1) and C23*(0). The selected carry signals with respect to the provisional carry signals C23*(1) and C23*(0) are output as the provisional carry signals C27*(1) and C27*(0).

Further, the multiplexer 28 has a second circuit portion, which functions to determine the real carry signal C27 by selecting one of the carry signals supplied from the transfer gates TG15 and TG16 on the basis of the value ('1' or '0') of the real carry signal C15 propagated from the multiplexer 26 (FIG. 5), when the real carry signal C15 is determined. The real carry signal C15 is a signal which is sifted from a partitioned adder (partitioned adder 14 in this case) which is spaced towards lower-order digits from the partitioned adder of concern (partitioned adder 17) by an amount corresponding to two or more partitioned adders. In this manner, the first and second circuit portions form a two-stage circuit in view of operation.

Referring to FIG. 10B, the above-mentioned first circuit includes the transfer gates TG15 and TG16, and inverters INV27, INV28, INV30 and INV31. The transfer gate TG15 is supplied with the carry signals C27(1) and C27(0). The transfer gate TG15 selects one of the carry signals C27(1) and C27(0), depending on the value of the provisional carry signal C23*(1). The transfer gate TG16 selects one of the provisional carry signals C27(1) and C27(0), depending on the value of the provisional carry signal C23*(0). The selected carry signal from the transfer gate TG15 passes through inverters INV29 and INV35, and is output as the provisional carry signal C27*(1). The selected carry signal from the transfer gate TG16 passes through inverters INV32 and INV37, and is output as the provisional carry signal C27*(0). The second circuit portion includes a transfer gate TG17 and inverters INV33, INV34, and INV36. The transfer gate TG17 selects one of the carry signals passing through the transfer gates TG15 and TG16, depending on the value of the real carry signal C15. The selected carry signal passes through the inverter INV36, and is output as the real carry signal C27. This is, the selected carry signal is substantially the provisional signal C*27(1) or C*27(0).

Figure 11:
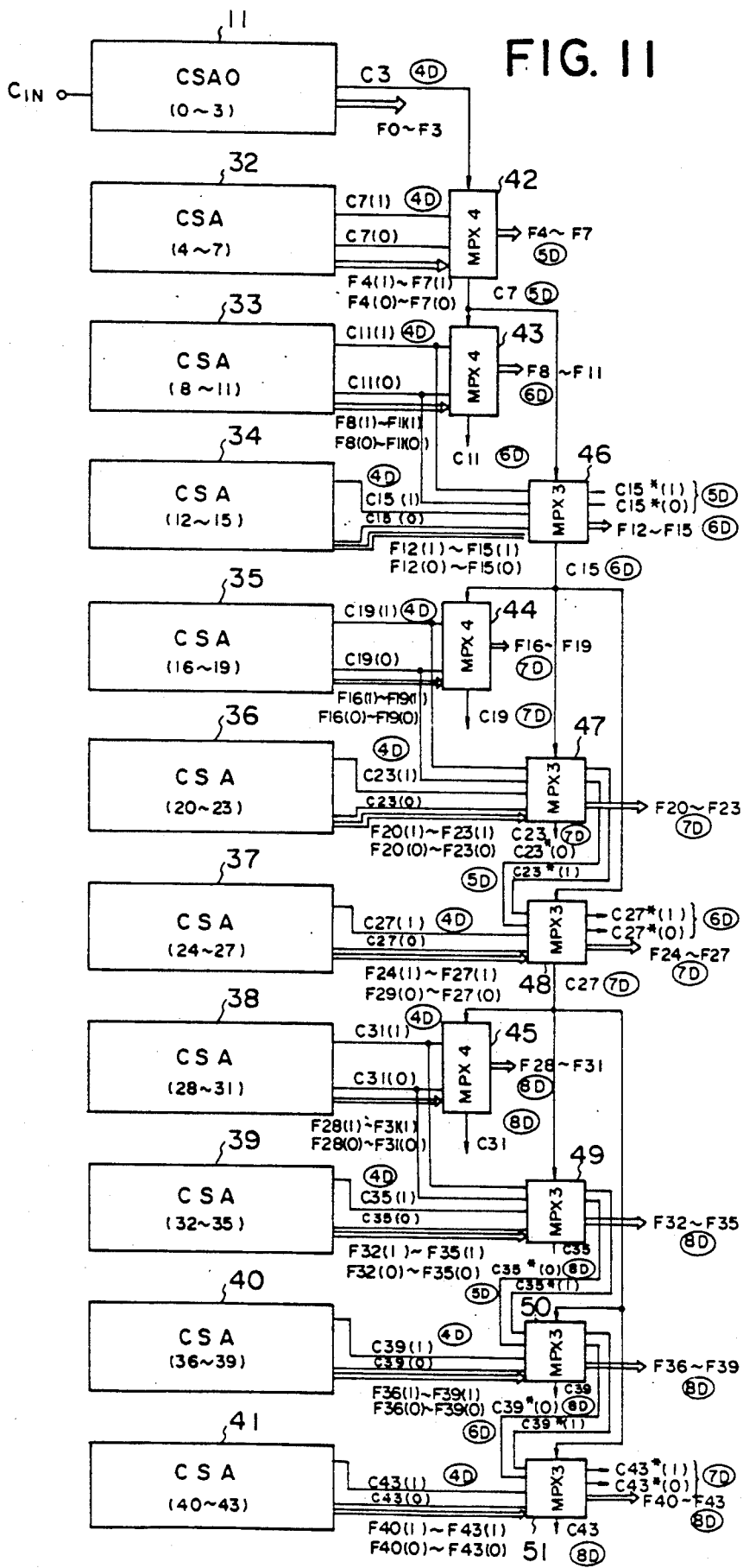
FIG. 11 is a block diagram of a second preferred embodiment of the present invention.

A description is given of a second preferred embodiment of the present invention with reference to FIG. 11. Referring to FIG. 11, the second embodiment includes partitioned adders 11, and 32 through 41, first multiplexers 42 through 45, and second multiplexers 46 through 51. Each of the partitioned adders 11, and 32 through 41 is a 4-bit-length carry select adder. The partitioned adder 11 is the same as the partitioned adder 11 shown in FIG. 5. The partitioned adders 32 through 41 have the same structure. The essential feature of the second embodiment is that provisional sum signals Fj(1) and Fj(0) (j=0-43 in the embodiment) are generated in the partitioned adders 32 through 41, and are then supplied to corresponding multiplexers 42 through 51. That is, a pair of provisional sum signals Fj(1) and Fj(0) is calculated beforehand with respect to each digit, and real sum signals are determined by selecting one of the paired provisional sum signals on the basis of the value of the real carry signal propagated from a lower-order digit. The carry processing of the second embodiment is the same as that of the first embodiment except that the real carry signals Cj (j=3, 7, 11, 15, 19, 23, 27, 31, 35, 39) are not supplied to the corresponding partitioned adders 32 through 41.

The partitioned adder 32 generates two sets of provisional sum signals F4(1) through F7(1) and F4(0) through F7(0) with a delay time of 4D, together with the provisional carry signals C7(1) and C7(0). The signals thus generated are supplied to the multiplexer 42, which selects one of the sets of the provisional sum signals F4(1) through F7(1) and F4(0) through F7(0) on the basis of the value of the real carry signal C3 propagated from the partitioned adder 11. The selected set of provisional sum signals are output as real sum signals F4 through F7. At this time, the real carry signal C7 is determined.

The partitioned adder 33 generates two sets of provisional sum signals F8(1) through F11(1) and F8(0) through F11(0), together with the provisional carry signals C11(1) and C11(0). The signals thus generated are supplied to the multiplexer 43, which selects one of the sets of the provisional sum signals F8(1)-F11(11) and F8(0)-F11(0) on the basis of the value of the real carry signal C7 propagated from the multiplexer 42. The selected set of provisional sum signals are output as real sum signals F8 through F11. At this time, the real carry signal C11 is determined.

The partitioned adder 34 generates two sets of provisional sum signals F12(1) through F15(1) and F12(0) through F15(0), together with the provisional carry signals C15(1) and C15(0). The signals thus generated are supplied to the multiplexer 46, which selects one of the sets of the provisional sum signals F12(1)-F15(1) and F12(0)-F15(0) on the basis of the value of the real carry signal C7 propagated from the multiplexer 42. The selected set of provisional sum signals are output as real sum signals F12 through F15. At the same time, the real carry signal C15 is determined. Before determining the real sum signals F11 through F15, the multiplexer 46 also generates the aforementioned pair of provisional carry signals C15*(1) and C15*(0) on the basis of the values of paired provisional carry signals C11(1), C11(0), and C15(1), C15(0).

It can be seen from the above that the multiplexers 42 through 51 can be constructed by adding a function of selecting provisional sum signals to the multiplexers 22 through 31.

The above-mentioned structure shown in FIG. 11 can be represented as follows. Partitioned adders are arranged for every n bits. A pair of provisional carry signals $C_{ns-1}(1)$ and $C_{ns-1}(0)$ (also represented as $C_k^*(1)$ and $C_k^*(0)$) is made propagated to higher-order digits by m digits (m=nl; l is a positive integer), before real carry signal $C_{(s-1)n-1}$ propagated from the digit which is one digit lower than the lowest-order digit in the s-th partitioned adder which is positioned upwards by s from the partitioned adder relating to the lowest-order digit, reaches the s-th partitioned adder. Thereby, a pair of provisional carry signals $C_k^*(1)$ and $C_k^*(0)$ (k=n(s+1)−1, n(s+2)−1, ..., n(s+l)−1 is generated. Thereafter, when the real carry signal $C_{(s-1)n-1}$ relating to the digit which is one digit lower than the s-th partitioned adder, is determined, +1 real carry signals $C_k$, $C_{ns-1}$ and real sum signals Fj amounting to m+n digits are selected and determined at the same time.

Table 2 shows the relationship between the highest digit to be processed (MSB; the most significant bit) and corresponding delay time of the sum signal associated with MSB, obtained by conventional adder of FIG. 4 and the second embodiment of the present invention.

TABLE 2

| Embodiment | | Prior Art | |
|---|---|---|---|
| MSB | Delay time | MSB | Delay time |
| 4–7 | 5D | 6–9 | 6D |
| 8–15 | 6D | 10–14 | 7D |
| 16–27 | 7D | 15–20 | 8D |
| 28–43 | 8D | 21–27 | 9D |
| 44–63 | 9D | 28–35 | 10D |
| 64–87 | 10D | 36–44 | 11D |
| 88–115 | 11D | 45–54 | 12D |
| 116–147 | 12D | 55–65 | 13D |
| | | 66–77 | 14D |
| | | 78–90 | 15D |
| | | 91–104 | 16D |
| | | 105–119 | 17D |
| | | 120–135 | 18D |
| | | 136–152 | 19D |

According to the second embodiment, it takes 1D or 2D shorter than in the case of the first embodiment to obtain the real sum signal relating to each digit. Therefore, the second embodiment is more suitable for applications where extremely high-speed processing is particularly required. On the other hand, the first embodiment can be constructed by a number of structural elements smaller than that for the second embodiment, because the first embodiment is not designed to generate the provisional sum signal for each digit. Therefore, the first embodiment may be of a smaller size and less expensive.

Figure 12A:
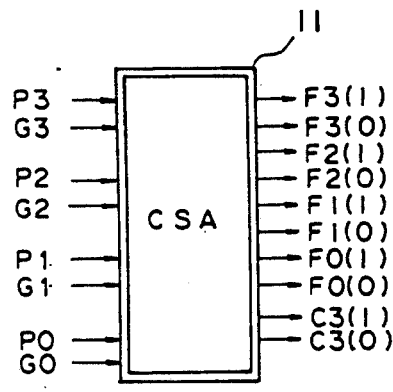
FIGS. 12A, 12B, 12C, 12D are views illustrating a partitioned adder used in the embodiment of FIG. 11.

FIGS. 12A through 12D are views illustrating an example of the structure for the partitioned adder 11. It is noted that in FIG. 11, it is assumed that the real carry signal $C_{IN}$ is '0' for conveniences' sake as in the first embodiment. That is, no carry signal is applied to the adder of FIG. 11. In this case, the partitioned adder 11 may be formed only by the structure of FIG. 12C. However, when the partitioned adder 11 is designed to actually receive the real carry digit $C_{IN}$ from the lower-order digit, the structure of FIGS. 12A through 12D is used for constructing the partitioned adder 11. Of course, the entire structure shown in FIGS. 12A through 12D is applied to the partitioned adders 32 through 41 as it is. Referring to FIG. 12A, the partitioned adder 11 receives the carry propagate signals P0 through P3, and the carry generate signals G0 through G3, and generates the provisional sum signals F0(1) through F3(1), F0(0) through F3(0), and the provisional carry signals C3(1) and C3(0). The above holds true for the partitioned adder 11 shown in FIG. 5.

Figure 12D:
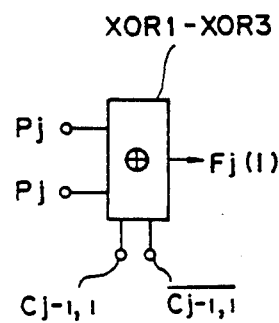
Figure 12B:
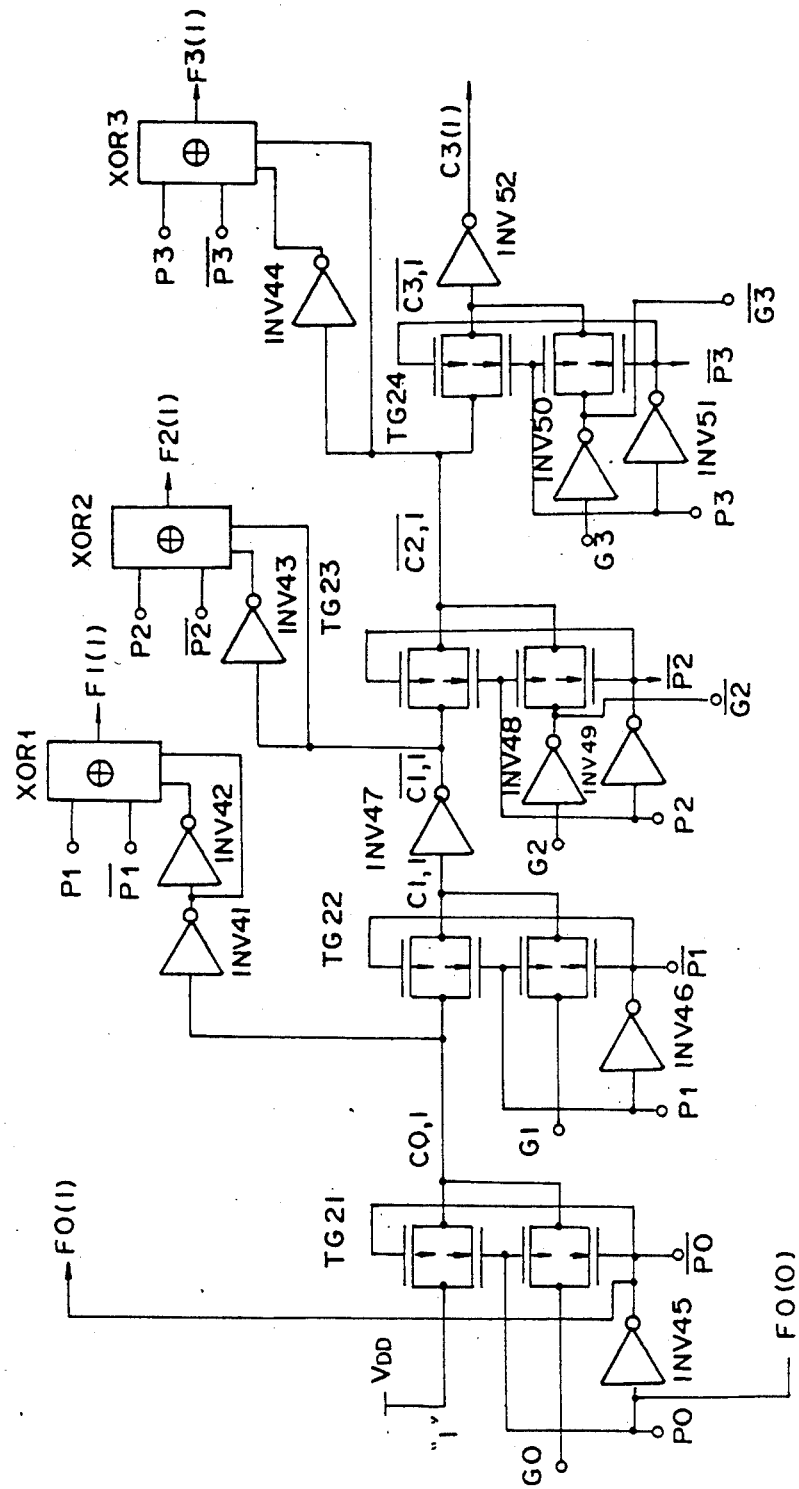

FIG. 12B illustrates a circuit portion, which generates the provisional sum signals F0(1) through F3(1), and the provisional carry signal C3(1), which are obtained when the carry signal is '1' which is propagated from the digit (j=−1) which is one bit lower than the partitioned adder 11. The illustrated circuit portion is made up of exclusive-OR gates XOR1 through XOR3, inverters INV41 through INV52, and transfer gates TG21 through TG24. The provisional sum signal F0(1) is obtained at the output of an inverter INV45, to which the carry propagate signal P0 is applied. The provisional sum signals F1(1) through F3(1) are output from the exclusive-OR gates XOR1 through XOR3, respectively. As shown in FIG. 12D, each of the exclusive-OR gates XOR1 through XOR3 receives the carry propagate signal Pj and the inverted carry propagate signal $\overline{Pj}$, and the carry signal Cj−1,1 and the inverted carry signal $\overline{Cj-1,1}$, and generates the provisional sum signal Fj(1) (=Pj⊕Cj−1,1). Such operation holds true for other exclusive-OR gates described hereinafter.

The provisional carry signal C3(1) is generated by a circuit portion, which is made up of the transfer gates TG21 through TG24 and related inverters INV45 through INV52. The transfer gate TG21 selects one of the carry propagate signal P0 and a value '1', depending on the values of the carry propagate signal P0 and inverted carry propagate signal $\overline{P0}$. The selected signal is supplied, as the carry signal C0,1, to the transfer gate TG22 and the inverter INV41. The transfer gate TG22 selects one of the carry signal C0,1 and the carry generate signal G1, depending on the values of the carry propagate signal P1 and inverted carry propagate signal $\overline{P1}$. The selected signal is the carry signal C1,1, which is supplied to the transfer gate TG23, the inverter INV43 and the exclusive-OR gate XOR2. The carry generate signal G2 is supplied to the inverter INV48 through the inverter INV48. The output signal of the transfer gate TG23 is the inverted carry signal $\overline{C2,1}$, which is supplied to the transfer gate TG24, the inverter 44 and the exclusive-OR gate XOR3. The carry generate signal G3 is supplied to the transfer gate TG24 through the inverter INV50. The output signal of the transfer gate TG24 is the inverted carry signal $\overline{C3,1}$, which is supplied to the inverter INV52. The output of the inverter INV52 is the provisional carry signal C3(1), which is one candidate to be propagated to the multiplexer 42 (FIG. 11).

Figure 12C:
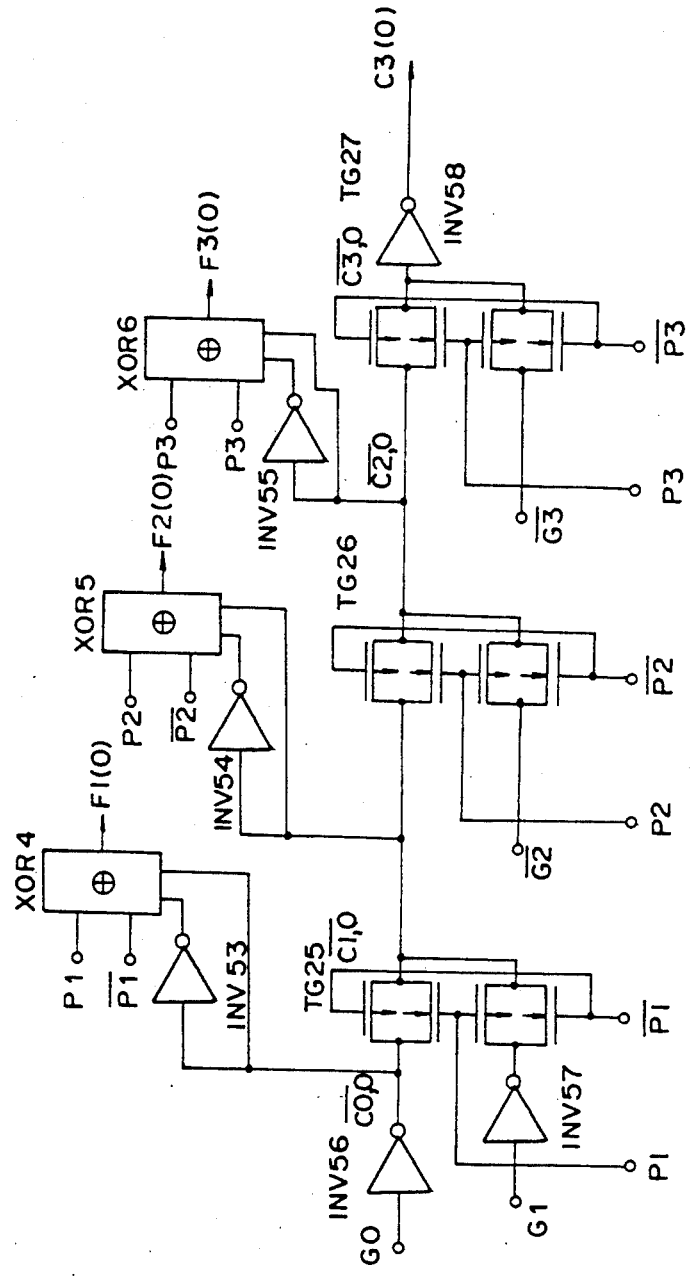

Referring to FIG. 12C, the provisional sum signal F0(0) is the carry propagate signal P0. The provisional sum signals F1(0) through F3(0) are output from the exclusive-OR gates XOR4 through XOR6, respectively. The provisional carry signal C3(0) is generated by a circuit portion, which is made up of the transfer gates TG25 through TG27, and associated inverters INV56 through INV58. The transfer gate TG25 is supplied with the carry generate signal G0 through the inverter INV56, and the carry generate signal G1 through the inverter 57, and selects one of the two input signals, depending on the values of the carry propagate signal P1 and inverted carry propagate signal $\overline{P1}$. The selected signal, i.e., the inverted carry signal $\overline{C1,0}$ is supplied to the transfer gate TG26, the inverter INV54 and the exclusive-OR gate XOR5. The transfer gate TG26 is also supplied with the inverted carry generate signal $\overline{G2}$, and selects one of the two input signals. The selected signal is the inverted carry signal $\overline{C2,0}$ which is then supplied to the transfer gate TG27, the inverter 55 and the exclusive-OR gate XOR6. The inverted carry generate signal $\overline{G3}$ is supplied to the transfer gate TG27, which selects one of the two input signals, depending on the values of the carry propagate signal P3 and inverted carry propagate signal $\overline{P3}$. The selected signal, i.e., the inverted carry signal $\overline{C3,0}$ is supplied to the inverter INV58, which outputs the provisional carry signal C3(0).

Figure 13:
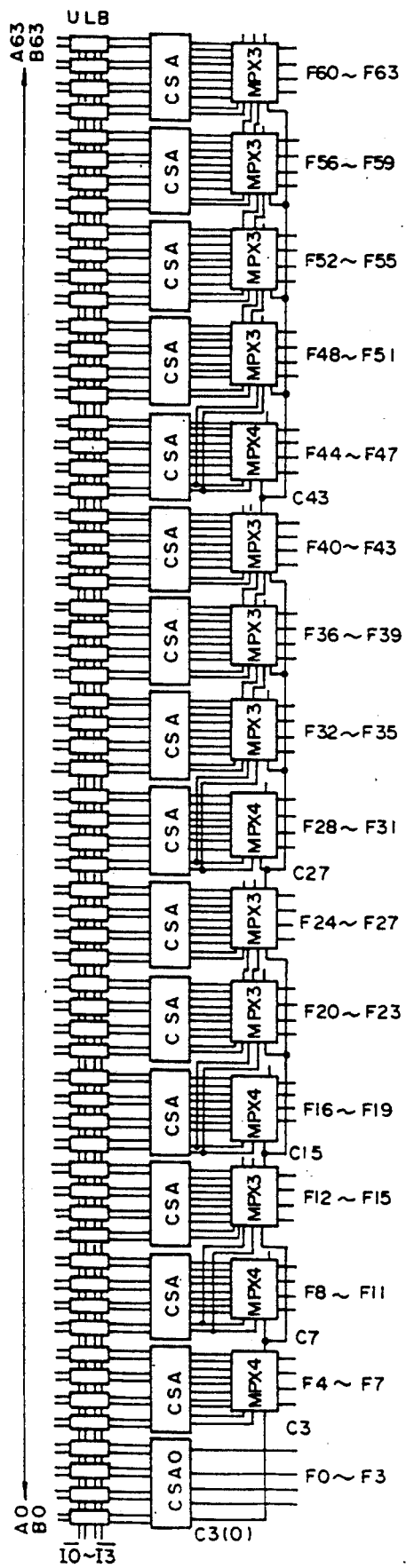
FIG. 13 is a block diagram showing the second embodiment together with a carry propagate/generate circuit.

FIG. 13 is a block diagram of a 64-bit-length arithmetic and logic unit based on the aforementioned second embodiment. In this figure, it is assumed that the partitioned adder relating to the lowest-order digit always outputs the provisional carry signal C3(0). As shown in FIG. 13, some multiplexers (MPX3, MPX4) and partitioned adders are added to the structure of FIG. 11 in order to process 64 bits. Further, carry propagate/generate units ULB are illustrated in FIG. 13. Each of the carry propagate/generate units ULB has functions of generating a bit Ai (i=0, 1, 2, ..., 63; A0–A63) of the i-th digit of 64-bit binary digit A, a bit Bi (B0-B63) of the i-th digit of 64-bit binary digit B, function selecting signals $\overline{I0}$ through $\overline{I3}$, carry propagate signals P0 through P63, and carry generate signals G0 through G63. A suitable known circuit may be used for forming the carry propagate/generate units ULB.

Figure 14A:
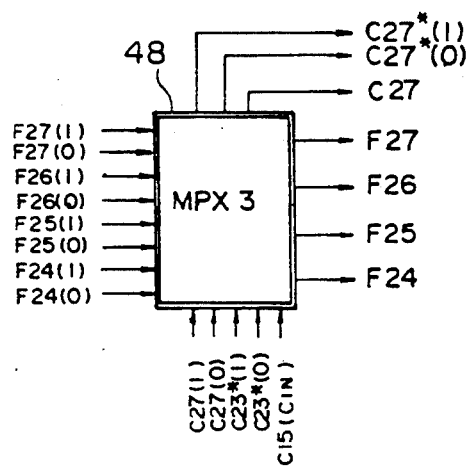
FIGS. 14A and 14B are views illustrating a first multiplexer used in the embodiment of FIG. 11.
Figure 14B:
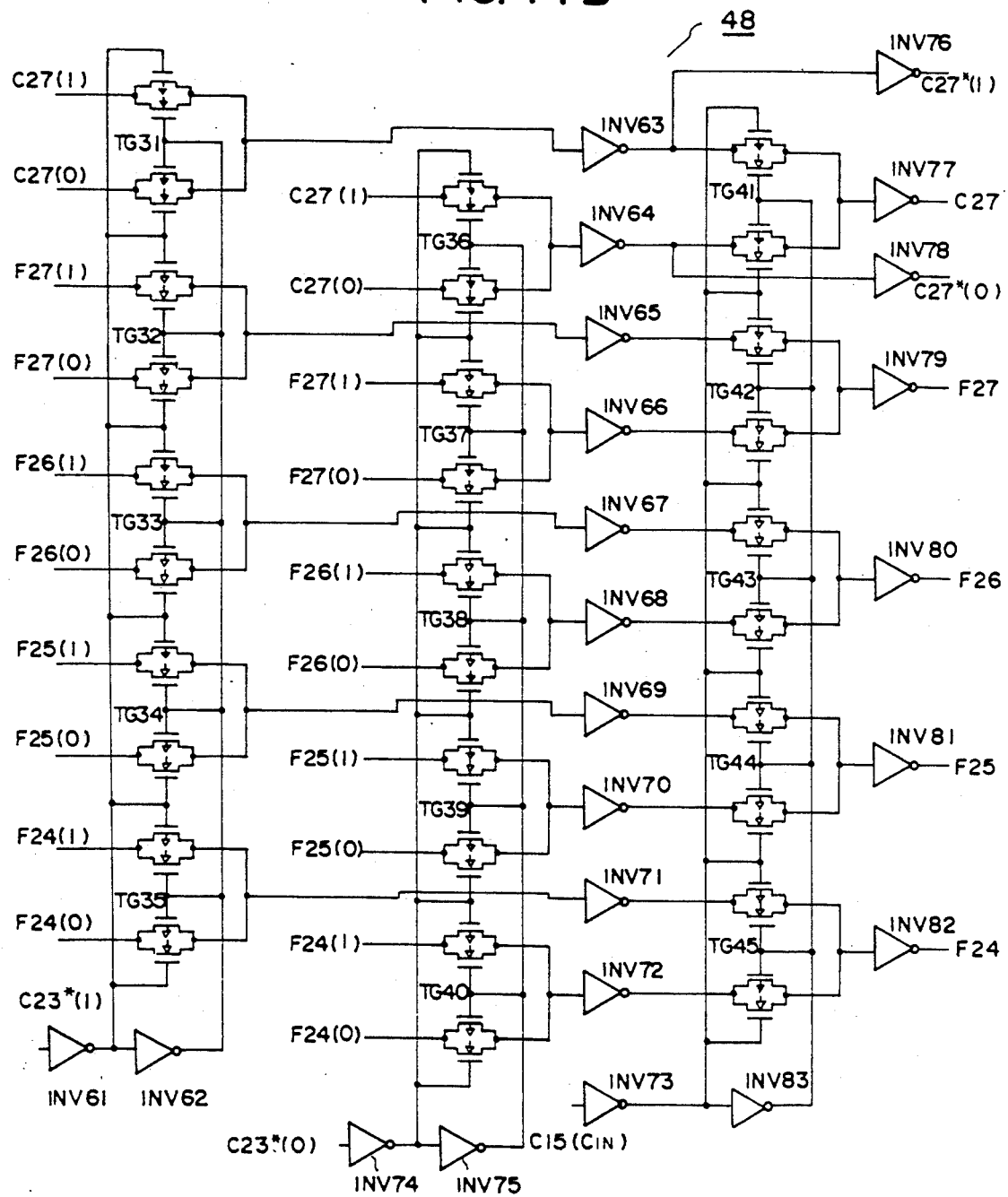

FIGS. 14A and 14B illustrate an example of the structure for the multiplexer (MPX3) 48 shown in FIG. 11. The illustrated structure is applied to each of the other multiplexers of the same type 46, 47, 49, 50 and 51. The multiplexer 48 may be constructed by adding a function of selecting one of two sets of provisional sum signals F24(1)-F27(1) and F24(0)-F27(0), in addition to the functions of the multiplexer 28 shown in FIGS. 10A and 10B.

The multiplexer 48 has a first circuit portion, which is provided with respect to each of the provisional carry signals C23*(1) and C23*(0) and functions to select one of the provisional carry signals C27(0) and C27(1) beforehand by referring to values of '1' and '0' of the provisional carry signals C23*(1) and C23*(0). The selected carry signals with respect to the provisional carry signals C23*(1) and C23*(0) are output as the provisional carry signals C27*(1) and C27*(0), respectively. Further, the multiplexer 48 has a second circuit portion, which functions to determine the real carry signal C27 by selecting one of the carry signals obtained with respect to the provisional carry signals C23*(1) and C23*(0) on the basis of a value '1' or '0' of the real carry signal C15 propagated from the multiplexer 46 (FIG. 11) when the real carry signal C15 is determined. The real carry signal C15 is a signal which is sifted from a partitioned adder (partitioned adder 34 in this case) which is spaced towards lower-order digits from the partitioned adder of concern (partitioned adder 37) by an amount corresponding to two or more partitioned adders. In this manner, the first and second circuit portions form a two-stage circuit in view of operation.

Referring to FIG. 14B, the above-mentioned first circuit includes the transfer gates TG31 through TG40, and inverters INV61 through INV76 and INV78. The transfer gates TG31 through TG35 are controlled by output signals of inverters INV61 and INV62. The transfer gates TG36 through TG40 are controlled by output signals of inverters INV74 and INV75. The transfer gates TG41 through TG45 are controlled by inverters INV73 and INV83. The inverters INV61, INV74 and INV73 are supplied with the provisional carry signals C23*(1), C23*(0) and the real carry signal C15, respectively.

The transfer gates TG31 and TG41 select either the provisional carry signals C27(1) or C27(0), and correspond to the transfer gates TG15 and TG16 shown in FIG. 10B. The inverters INV63 and INV64 correspond to the inverters INV29 and INV32 shown in FIG. 10B. A circuit portion, which is made up of the transfer gates TG32 and TG37 and inverters INV65 and INV66, is provided with respect to each of the provisional carry signals C23*(1) and C23*(0) in order to select one of the provisional sum signals F27(1) and F27(0). In the same way, the transfer gates TG33 and TG38, and the inverters INV67 and INV68 are provided with respect to the provisional sum signals F26(1) and F26(0). The transfer gates TG34 and TG39, and the inverters INV69 and INV70 are provided with respect to the provisional sum signals F25(1) and F25(0). The transfer gates TG35 and TG40, and the inverters INV71 and INV72 are provided with respect to the provisional sum signals F24(1) and F24(0).

The multiplexer 48 also includes a second circuit portion, which includes the transfer gates TG41 through TG45, and inverters INV77, INV79, INV80, INV81 and INV82. The transfer gate T42 selects one of the provisional sum signals supplied from the inverters INV65 and INV66. The selected signal passes through the inverter 79, which outputs the real sum signal F27. The transfer gate T43 selects one of the provisional sum signals supplied from the inverters INV67 and INV68. The selected signal passes through the inverter 80, which outputs the real sum signal F26. The transfer gate T44 selects one of the provisional sum signals supplied from the inverters INV69 and INV70. The selected signal passes through the inverter 81, which outputs the real sum signal F25. The transfer gate T45 selects one of the provisional sum signals supplied from the inverters INV71 and INV72. The selected signal passes through the inverter 82, which outputs the real sum signal F24.

Figure 15A:
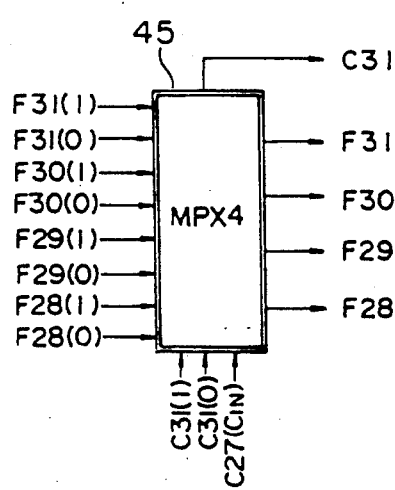
FIGS. 15A and 15B are views illustrating a second multiplexer used in the embodiment of FIG. 11.
Figure 15B:
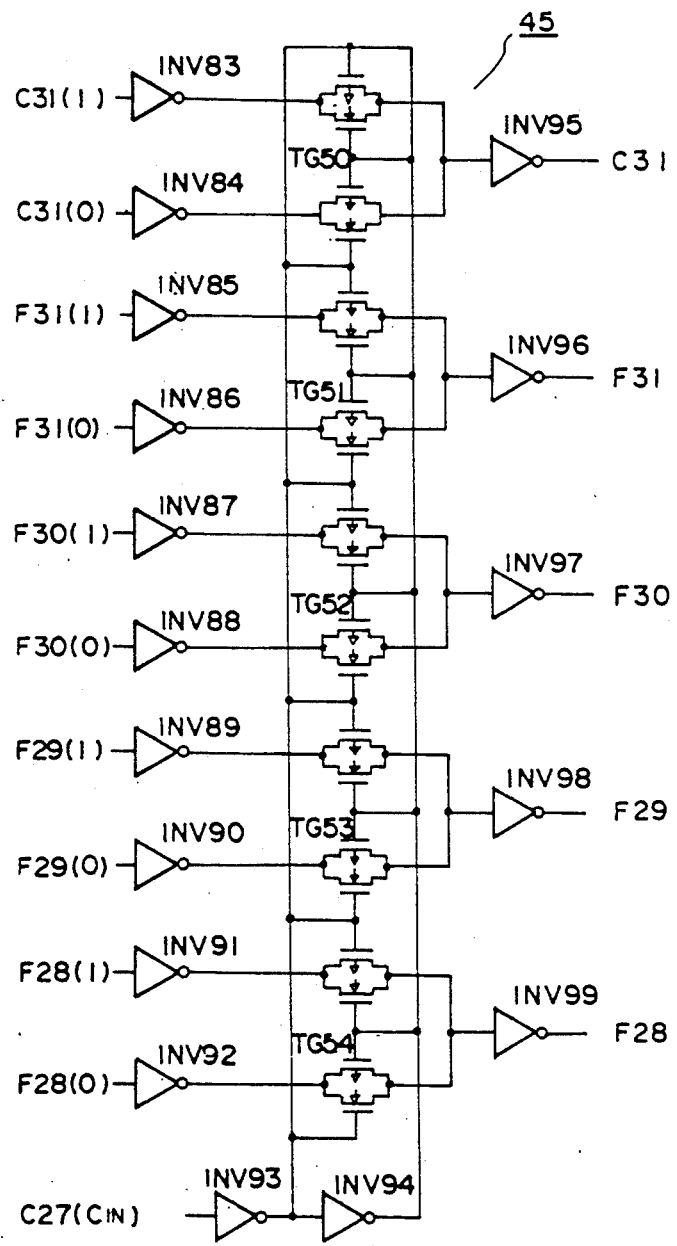

FIGS. 15A and 15B illustrate an example of the structure for the multiplexer (MPX4) 45. The illustrated structure is applied to each of the other multiplexers of the same type 42 through 44. The multiplexer 45 has functions of selecting one of the provisional carry signals C31(1) and C31(0) and selecting one of two sets of provisional sum signals F28(1) through F31(1) and F28(0) through F31(0), on the basis of a value '1' or '0' of the real carry signal C27.

Referring to FIG. 15B, the multiplexer 45 includes the transfer gates TG50 through TG54, and inverters INV83 through INV99. The transfer gate TG50 corresponds to the transfer gate TG14 shown in FIG. 9B. The inverters INV83, INV84 and INV95 correspond to the inverters INV22, INV23 and INV26 shown in FIG. 9B, respectively. The inverters INV93 and INV94 correspond to the inverters INV24 and INV25 shown in FIG. 9B, respectively. The output signals of the inverters INV93 and INV94 are supplied to the transfer gates TG50 through TG54. A circuit portion identical to the circuit portion, which consists of the transfer gate TG50 and inverters INV83, INV84 and INV95, is provided for each of the pairs of provisional sum signals F31(1), F31(0); F30(1), F30(0); F29(1), F29(0); and F28(1), F28(0). That is, the transfer gate TG51 and the inverters INV85, INV86 and INV96 are provided with respect to the provisional sum signals F31(1) and F31(0). The transfer gate TG52 and the inverters INV87, INV88 and INV97 are provided with respect to the provisional signals F30(1) and F30(0). The transfer gate TG53 and the inverters INV89, INV90 and INV98 are provided with respect to the provisional signals F29(1) and F29(0). The transfer gate TG54 and the inverters INV91, INV92 and INV99 are provided with respect to the provisional sum signals F29(1) and F29(0).

In operation of the second embodiment, the multiplexer 42 relating to the fourth to seventh digits outputs the real sum signals F4 through F7 and the real carry signals C7 at the same time. The real carry signal C7 is supplied to the multiplexer 43 which determines the real sum signals F8 through F11, and also the multiplexer 46 which determines the real sum signals F12 through F15. Before the supply of the real carry signal C7, the multiplexer 46 already generates the provisional carry signals C15*(1) and C15*(0) by using the provisional carry signals C11(1) and C11(0) propagated from the partitioned adder 33, and the provisional carry signals C15(1) and C15(0) supplied from the partitioned adder 34. Then, when the real carry signal C7 is supplied to the multiplexers 43 and 46, the real carry signals C11 and C15 are simultaneously determined, and the real sum signals F8 through F11 and F12 through F15 are also determined at the same time.

Figure 16:
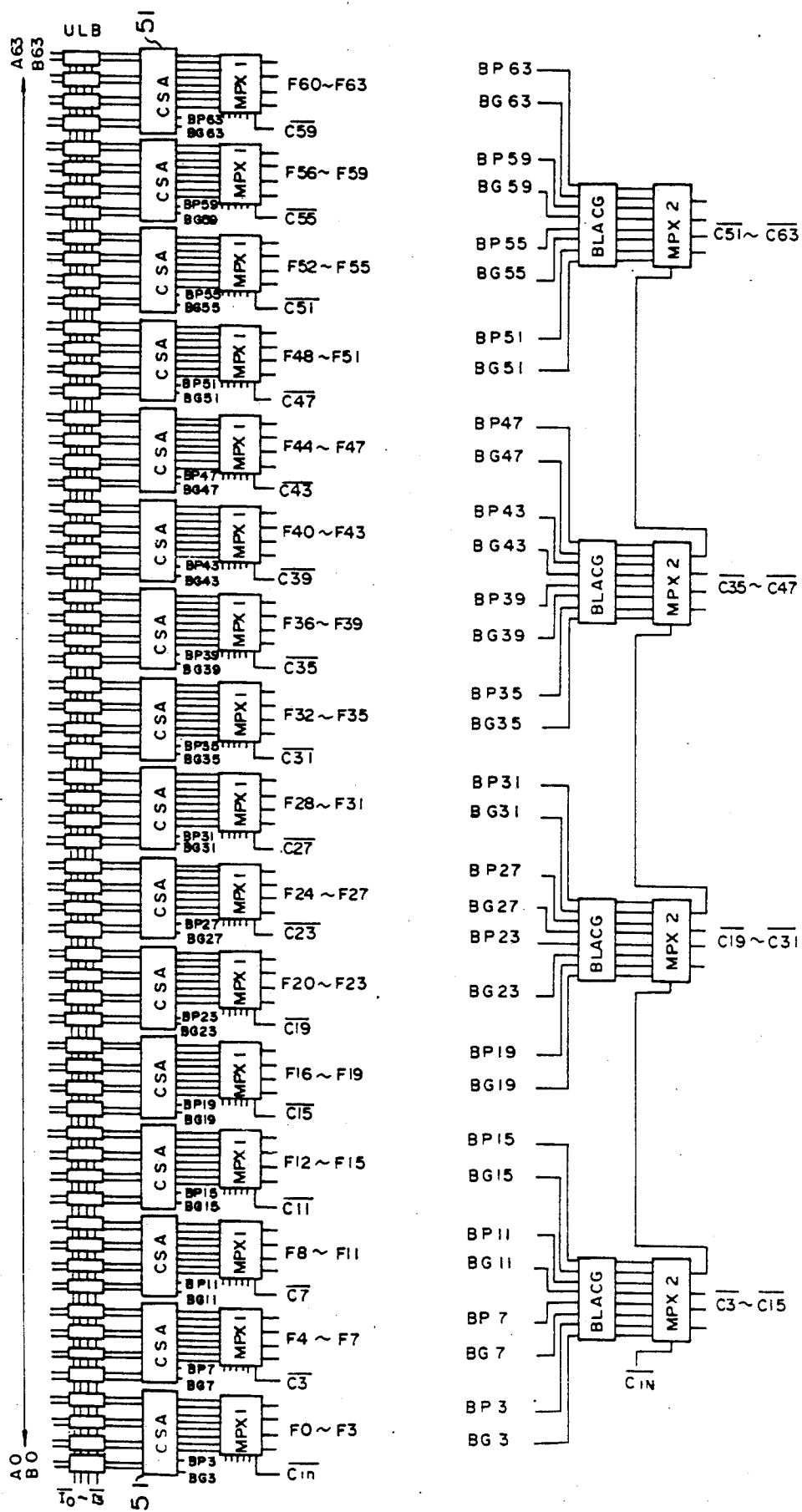
FIG. 16 is a block diagram of a third preferred embodiment of the present invention.

A description is given of a third embodiment of the present invention. The third embodiment corresponds to a variation of the second embodiment. FIG. 16 illustrates the entire structure of a 64-bit-length two-stage carry select adder (a 64-bit ALU) according to the third embodiment. The essential feature of the third embodiment lies in that carry signals are generated by using a block look ahead carry propagate signal BPj and a block look ahead carry generate signal BGj.

Referring to FIG. 16, the second embodiment includes carry propagate/generate units ULB, which are the same as the aforementioned carry propagate/generate units ULB shown in FIG. 13, 16 partitioned adders (CSA) 51, 16 first multiplexers MPX1, 4 block look ahead carry generate circuits BLACG, and 4 second multiplexers MPX2.

Figures 17A, 17B:
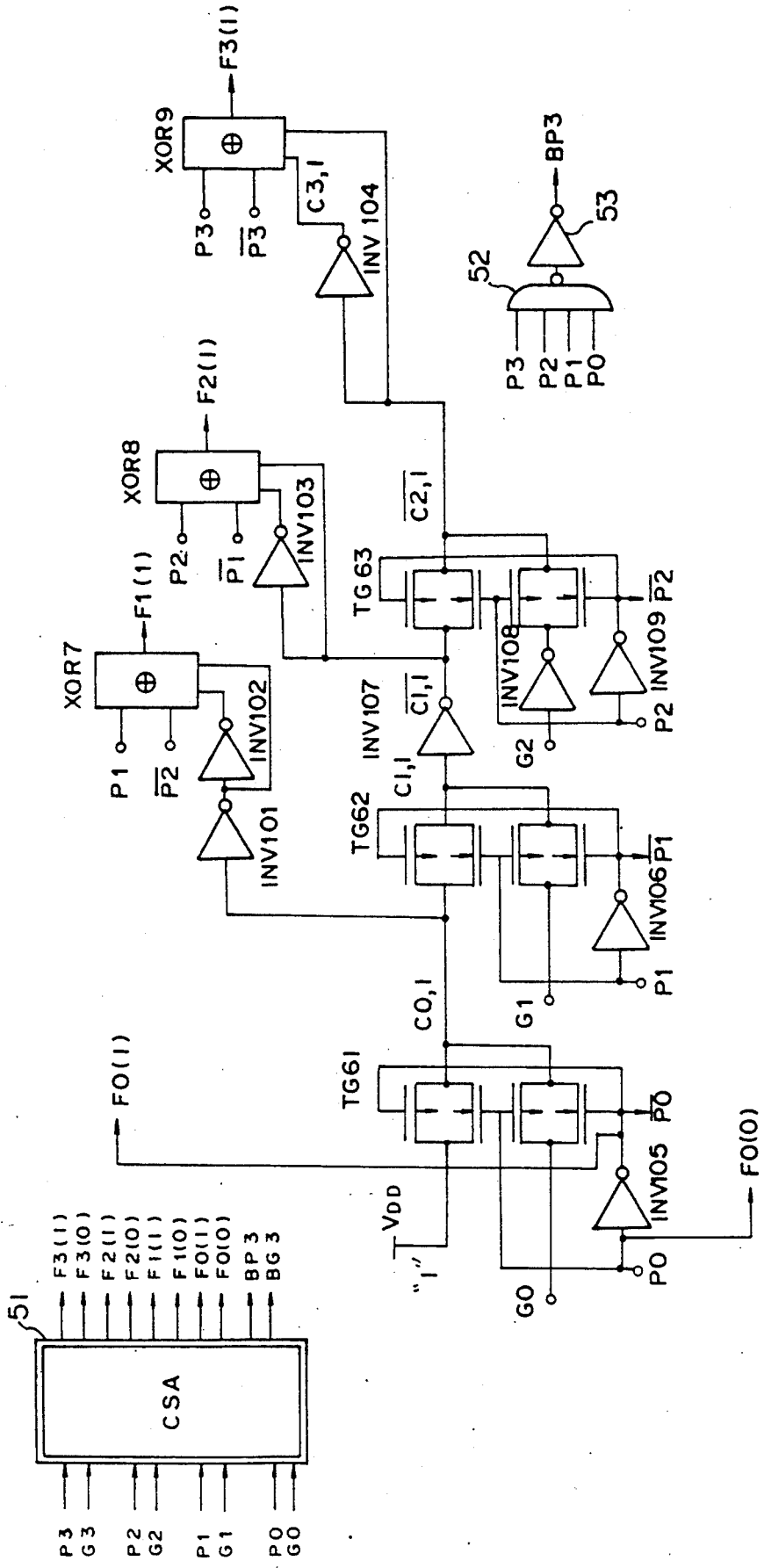
FIGS. 17A, 17B, 17C are views illustrating a partitioned adder used in the embodiment of FIG. 16.
Figure 17C:
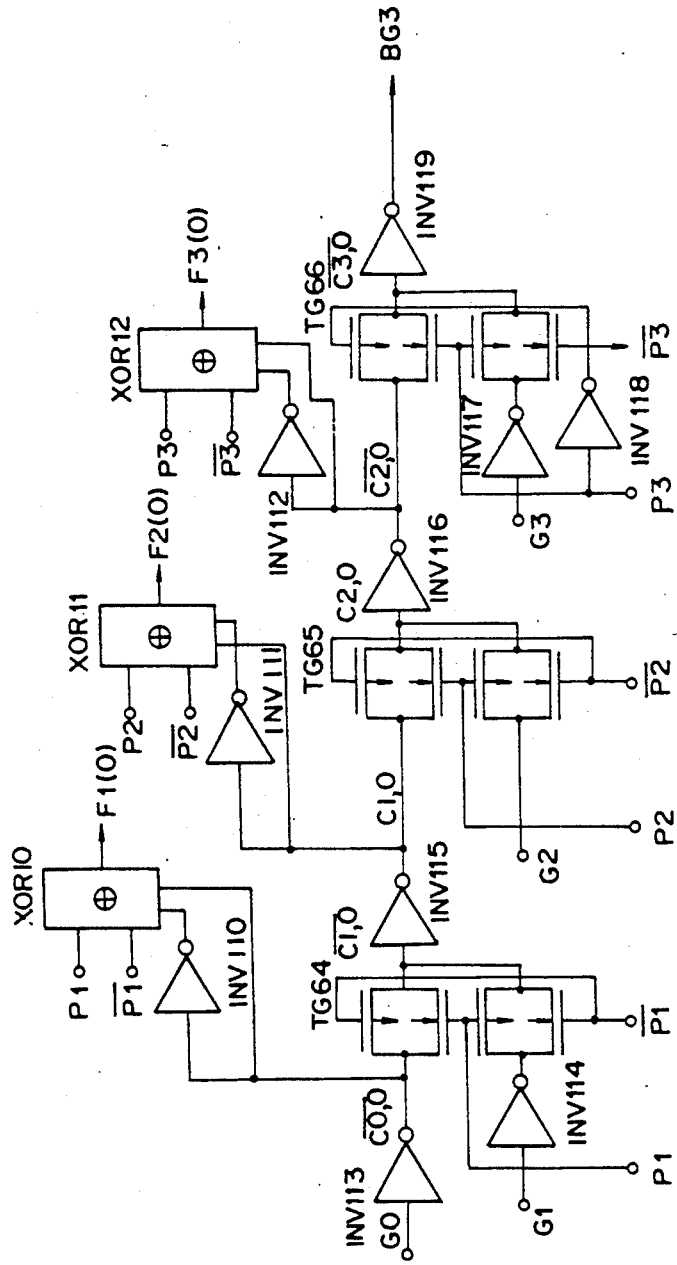

An example of the structure for the partitioned adder 51 relating to the zeroth bit to the third bit is illustrated in FIGS. 17A through 17C. The illustrated structure is applied to each of the other partitioned adders of the same type. Referring to FIG. 17A, the partitioned adder 51 receives carry propagate signals P0 through P3, and carry generate signals G0 through G3, and generates provisional sum signals F0(1) through F3(1) which are obtained when the carry signal Cj (j=−1) is '1', and provisional sum signals F0(0) through F3(0) which are obtained when the carry Cj (j=−1) is '0'. The partitioned adder 51 further generates a block look ahead carry propagate signal BP3 and a block look ahead carry generate signal BG3.

FIG. 17B illustrates a circuit portion, which generates the provisional sum signals Fj(1) (j=0, 1, 2, 3) obtained when the carry Cj (j=−1) is '1', and generates the block look ahead carry propagate signal BP3 to be propagated to a higher-order digit. The circuit includes exclusive-OR gates XOR7 through XOR9, transfer gates TG61 through TG63, and inverters INV101 through INV109. Each exclusive-OR gate may be formed with the circuit of FIG. 8. The provisional sum signal F0(1) is output from the inverter INV105. The provisional sum signals F1(1) through F3(1) are available at outputs of the exclusive-OR gates XOR7 through XOR9, respectively. The block look ahead carry propagate signal BP3 is generated by a 4-input NAND gate 52 and an inverter 53. The 4-input NAND gate 52 is supplied with the carry propagate signals P0 through P3. The output signal of the NAND gate 52 passes through the inverter 53, which outputs the block look ahead carry propagate signal BP3.

FIG. 17C illustrates a circuit portion, which generates the provisional sum signals Fj(0) (j=0, 1, 2, 3) obtained when the carry Cj (j=−1) is '0', and generates the block look ahead carry generate signal BG3 to be propagated to a higher-order digit. The circuit includes exclusive-OR gates XOR10 through XOR12, transfer gates TG64 through TG66, and inverters INV110 through INV119. The provisional sum signal F0(0) is the carry propagate signal P0. The provisional sum signals F1(0) through F3(0) are available at outputs of the exclusive-OR gates XOR10 through XOR13, respectively. The block look ahead carry generate signal BG3 is generated from the output of the inverter INV119.

Figure 18A:
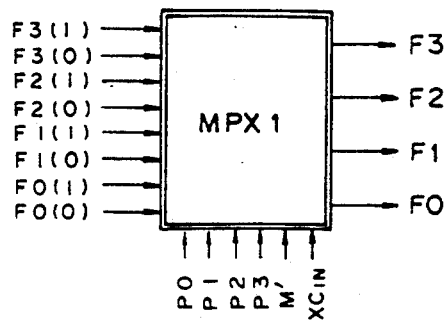
FIGS. 18A and 18B are views illustrating a first multiplexer used in the embodiment of FIG. 16.
Figure 18B:
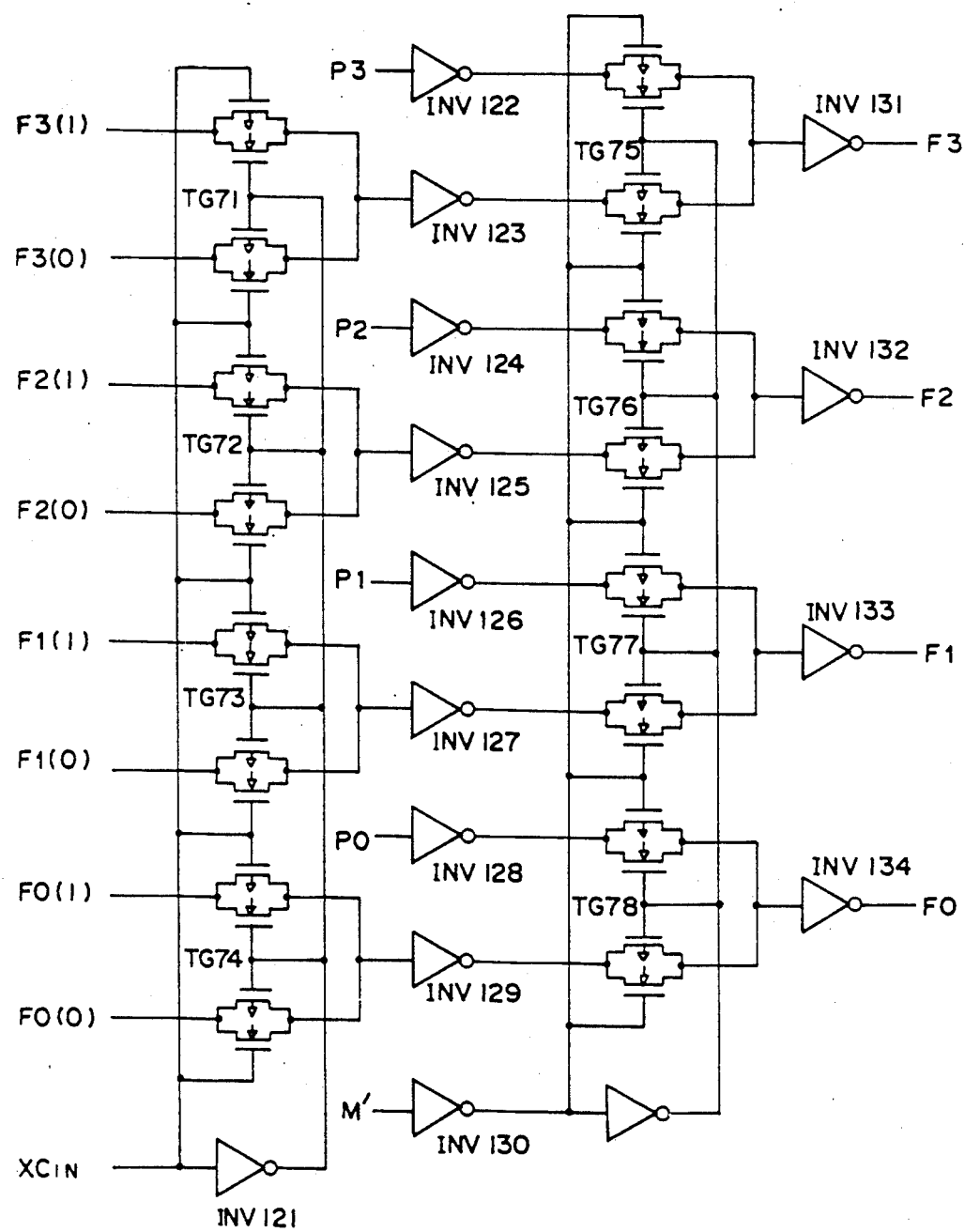

FIGS. 18A and 18B illustrate an example of the structure for the multiplexer MPX1 relating to the zeroth digit to the third digit. The illustrated structure is applied to the remaining multiplexers MPX1 of the same type. Referring to FIG. 18A, the multiplexer MPX1 is supplied with the provisional sum signals F0(1) through F3(1) and F0(0) through F3(0), the carry propagate signals P0 through P3, an inverted real carry signal $XC_{IN}$ propagated from a digit which is one bit lower than the lowest-order digit, and an ALU function selecting signal M' used for selecting either a first mode for outputting the arithmetic summation or a second mode for outputting the logic operation result.

Referring to FIG. 18B, the multiplexer MPX1 is made up of transfer gates TG71 through TG78, and inverters INV121 through INV134. The inverted real carry signal $XC_{IN}$ is supplied to the inverter INV121 and the transfer gates TG71 through TG74. The output signal of the inverter INV121 is supplied to the transfer gates TG71 through TG74. The transfer gates TG71 through TG74 select one of the corresponding provisional sum signals, depending on the value of the inverted real carry signal $XC_{IN}$. The selected provisional sum signals output from the transfer gates TG71 through TG74 pass through the inverters INV123, INV125, INV127 and INV129, and are then supplied to the transfer gates TG75 through TG78, respectively. The carry propagate signals P3, P2, P1 and P0 pass through the inverters INV122, INV124, INV126 and INV128, and are supplied to the transfer gates TG75 through TG79, respectively. Each of the transfer gates TG75 through TG79 selects one of the corresponding signals, depending on the ALU function selecting signal M'. The selected signal output from the transfer gates TG75 through TG79 pass through the respective inverters INV131 through INV134, output signals of which are the real sum signals F3 through F0. It can be seen from the above that when the inverted real carry propagate signal $SC_{IN}$ is determined, the real sum signals Fj are immediately determined.

Figure 19A:
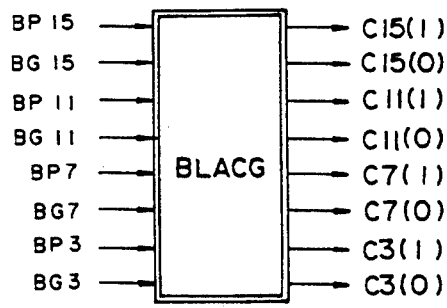
FIGS. 19A, 19B, 19C are views illustrating a block look ahead carry generate circuit used in the embodiment of FIG. 16.
Figure 19B:
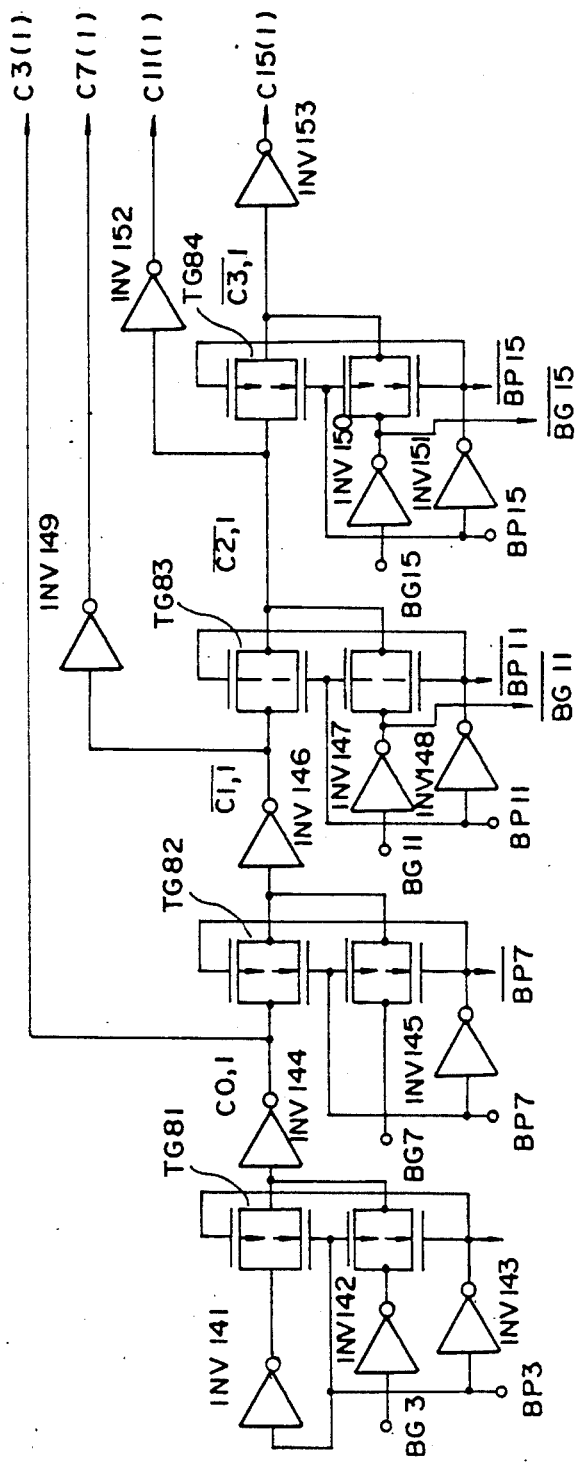
Figure 19C:
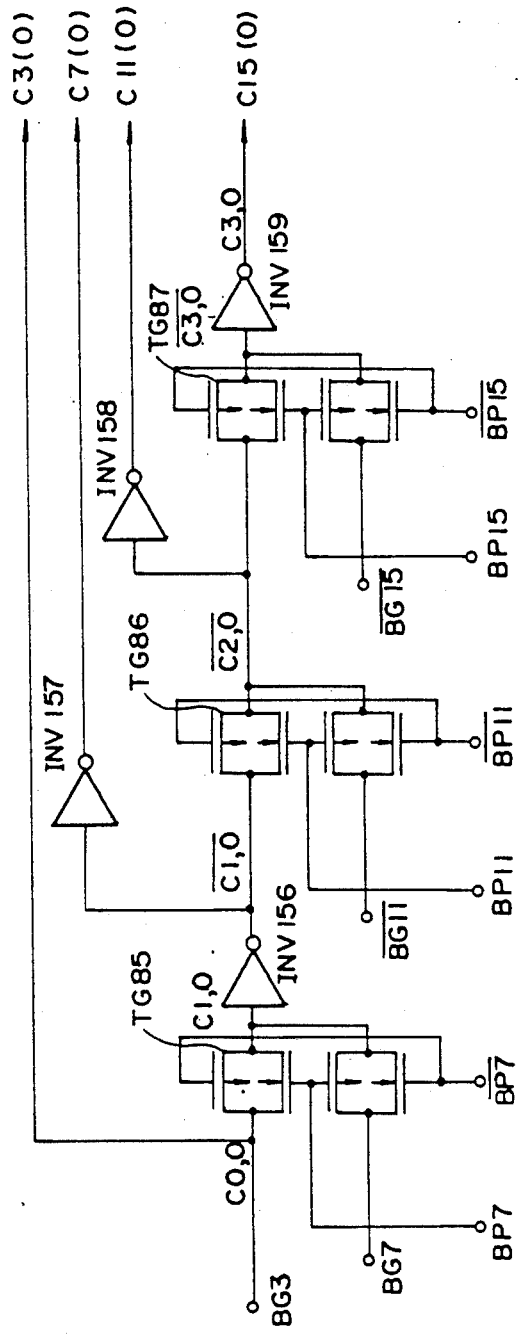

FIGS. 19A through 19C illustrate an example of the structure for the block look ahead carry generate circuit BLACG associated with four partitioned adders CSA relating to the zeroth digit to the fifteenth digit. The illustrated structure is applied to each of the other block look ahead carry generate circuits BLACG. The circuit BLACG is supplied with the block look ahead carry propagate signals BP3, BP7, BP11 and BP15, and the block look ahead carry generate signals BG3, BG7, BG11 and BG15. Then, the circuit BLACG generates the provisional carry signals C3(1), C3(0), C7(1), C7(0), C11(1), C11(0), C15(1) and C15(0).

FIG. 19B shows a circuit portion relating to the case where the carry Cj (j=−1) is '1' which is propagated from a digit which is one bit lower than the lowest-order digit. This circuit portion is made up of transfer gates TG81 through TG84, and inverters INV141 through INV153. The transfer gates TG81 through TG84 are controlled by the block look ahead carry propagate signals BP3, BP7, BP11 and BP15 as well as the inverted signals thereof, respectively. The transfer gate TG81 selects one of the block look ahead carry propagate signal BP3 and the inverted block look ahead carry generate signal $\overline{GB3}$. The signal selected by the transfer gate TG81 passes through the inverter INV141, and is then supplied to the transfer gate TG82 and is also output as the provisional carry signal C3(1). The transfer gate TG82 is supplied with the block look ahead carry generate signal BG7. The signal from the transfer gate TG82 passes through the inverter INV146, and is supplied to the transfer gate TG83 and the inverter INV149. The output signal of the inverter INV149 is the provisional carry signal C7(I). The transfer gate TG83 is supplied with the inverted block look ahead carry generate signal BG11. The signal selected by the transfer gate TG83 is supplied to the transfer gate TG84 and the inverter INV152. The output signal of the inverter INV152 is the provisional carry signal C11(1). The signal selected by the transfer gate TG84 passes through the inverter INV153, and is then output as the provisional carry signal C15(1).

FIG. 19C shows a circuit portion relating to the case where the carry Cj (j=−1) is '0' which is propagated from a digit which is one bit lower than the lowest-order digit. This circuit portion is made up of transfer gates TG85 through TG87, and inverters INV156 through INV159. The transfer gates TG85 through TG87 are controlled by the block look ahead carry propagate signals BP7, BP11 and BP15 as well as the inverted signals $\overline{BP7}$, $\overline{BP11}$ and $\overline{BP15}$. The block look ahead carry generate signal BG3, which is output as the provisional carry signal C3(0), is supplied to the transfer gate TG85, to which the block look ahead carry generate signal BG7 is supplied. The signal output from the transfer gate TG85 passes through the inverter INV156, and is then supplied to the transfer gate TG86 and the inverter INV157. The output signal of the inverter INV 157 is the provisional carry signal C7(0). The transfer gate TG86 is supplied with the inverted block look ahead carry generate signal $\overline{BG11}$. The signal selected by the transfer gate TG86 is supplied to the transfer gate TG87 and the inverter INV158. The output signal of the inverter INV158 is the provisional carry signal C11(0). The transfer gate TG87 is supplied with the inverted block look ahead carry generate signal $\overline{BG15}$. The output signal of the transfer gate TG87 passes through the inverter INV159, and is then output as the provisional carry signal C15(0).

Figure 20A:
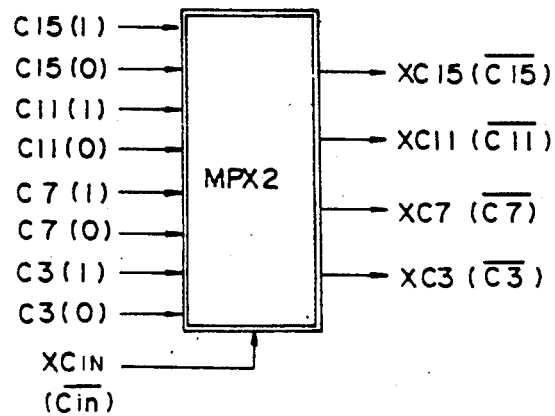
FIGS. 20A and 20B are views illustrating a second multiplexer used in the embodiment of FIG. 16.
Figure 20B:
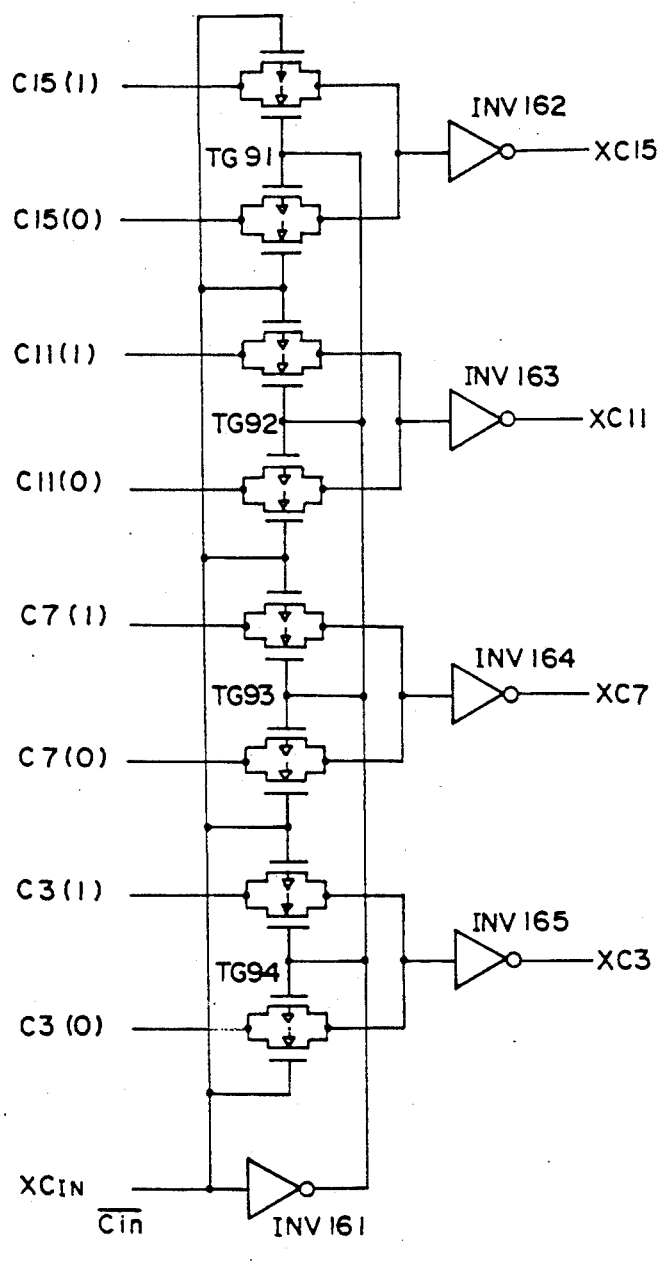

FIG. 20A and 20B illustrate an example of the structure for the multiplexer MPX2 associated with four partitioned adders CSA relating to the zeroth digit to the fifteenth digit. The illustrated structure is applied to each of the other multiplexers MPX2 of the same type. As shown in FIG. 20A, the multiplexer MPX2 is supplied with the provisional carry signals C3(1) through C15(1) and C3(0) through C15(0), and the inverted real carry signal $XC_{IN}$. Then the multiplexer MPX2 generates inverted real carry signals $\overline{Ci}$ (i=3, 7, 11, 15), namely, XC3, XC8, XC11 and XC15.

As shown in FIG. 20B, the multiplexer MPX2 includes transfer gates TG91 through TG94, and inverters INV161 through INV165. The inverted real carry signal $XC_{IN}$ ($\overline{Cj}$ (j=−1)) is supplied to each of the transfer gates TG91 through TG94. The output signal of the inverter INV161 is supplied to each transfer gate. The transfer gate TG91 selects one of the provisional carry signals C15(1) and C15(0). The selected signal passes through the inverter INV162, and is then output as the inverted real carry signal XC15. The transfer gate TG92 selects one of the provisional carry signals C11(1) and C11(0). The selected signal passes through the inverter INV163, and is then output as the inverted real carry signal XC11. The transfer gate TG93 selects one of the provisional carry signals C7(1) and C7(0). The selected signal passes through the inverter INV164, and is then output as the inverted real carry signal XC7. The transfer gate TG94 selects one of the provisional carry signals C3(1) and C3(0). The selected signal passes through the inverter INV165, and is then output as the inverted real carry signal XC3. When the inverted real carry signal $XC_{IN}$ is determined, the inverted real carry signals XC3, XC7, XC11 and XC15 are immediately determined.

As shown in FIG. 16, the inverted real carry signal XC15 is propagated to the multiplexer MPX2 relating to the sixteenth digit to thirty-first digit. In this way, the inverted real carry signal $XC_{IN}$ relating to the highest-order digit in each multiplexer MPX2 is propagated to higher-order multiplexer MPX2.

In the third embodiment, each carry signal Cj,0 and each block look ahead carry generate signal BGi necessary for the carry propagating process are generated by the same circuit of transfer gates and inverters. Further, the provisional carry signal Ci(1) for each digit is generated by using the block look ahead carry propagate signals BPi and the block look ahead carry generate signals BGi which are generated for every four digits by using the same circuit of transfer gates and inverters. Moreover, the provisional carry signal Ci(0) of each digit is generated for every 16 digits amounting to four partitioned adders CSA by the same circuit of transfer gates and inverters. Thereby, it becomes possible to immediately select and determine the real carry signal Ci to be propagated to a higher-order digit when the real carry signal relating to the digit which is one digit lower than the lowest-order digit in the partitioned adder of concern, is determined. This enables it to be possible to perform arithmetic and logic operation at high speeds.

A description is given of a fourth embodiment of the present invention. The fourth embodiment corresponds to a variation of the third embodiment.

Figure 21:
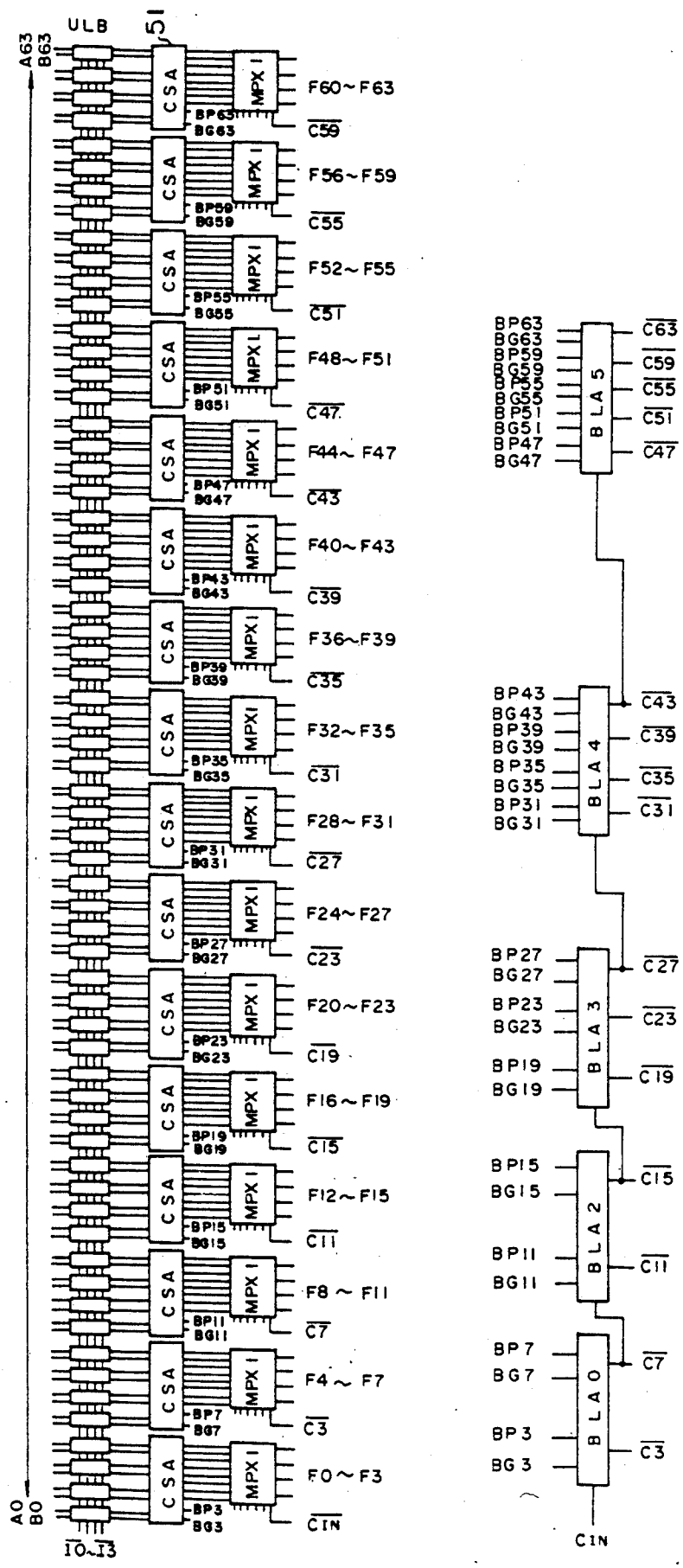
FIG. 21 is a view illustrating a fourth preferred embodiment of the present invention.

FIG. 21 illustrates the entire structure of the fourth embodiment. The carry propagate/generate units ULB, 4-bit partitioned adders (CSA) 51, and multiplexers MPX1 used in the fourth embodiment are identical to those for the third embodiment. The essential feature of the fourth embodiment is that the number of digits subjected to the look ahead process where block look ahead propagate and generate signals BPi and BGi are used, increases towards the highest-order digit. As shown in FIG. 21, the fourth embodiment includes five block look ahead carry generate circuits BLA0, BLA2, BLA3, BLA4 and BLA5. Each of the circuits BLA0 and BLA2 generates inverted real carry signals amounting to two bits. The circuit BLA3 generates inverted real carry signals amounting to three bits. The circuit BLA4 generates inverted real carry signals amounting to four bits. The circuit BLA5 generates inverted real carry signals amounting to five bits.

Figure 22A:
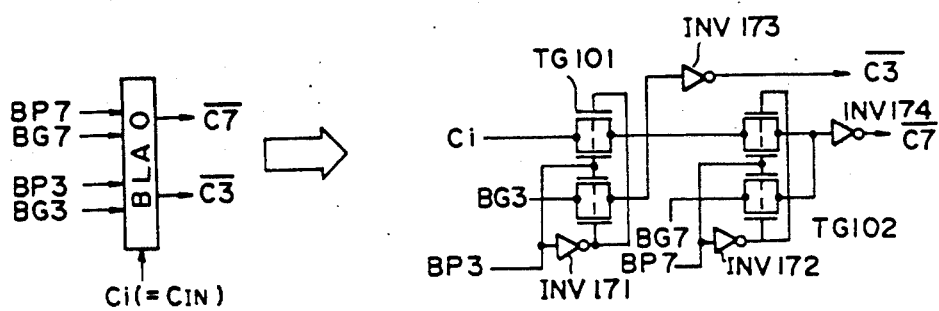
FIGS. 22A, 22B, 22C, 22D, 22E are views illustrating block look ahead carry generate circuits used in the embodiment of FIG. 21.

FIG. 22A shows the structure of the block look ahead carry generate circuit BLA0, which is related to the lowest-order digit block. The circuit BLA0 is supplied with the block look ahead carry propagate signals BP3, BP7, block look ahead carry generate signals BG3, BG7, and the real carry signal Ci (i=−1). Then the circuit BLA0 generates the inverted real carry signals $\overline{C3}$ and $\overline{C7}$. The circuit BLA0 is made up of transfer gates TG101 and TG102, and inverters INV171 through INV174.

Figure 22B:
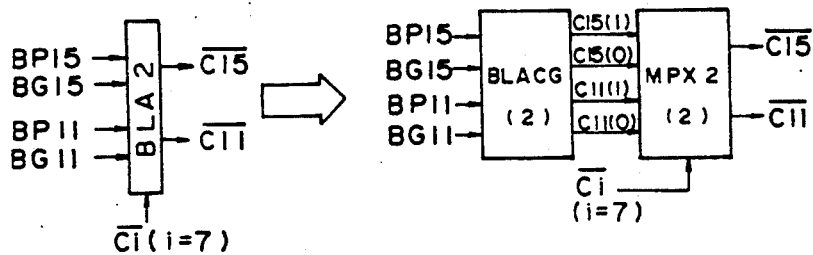

FIG. 22B shows the structure of the block look ahead carry generate circuit BLA2 relating to the eighth digit to the fifteenth digit. The circuit BLA2 is supplied with the block look ahead carry propagate signals BP11 and BP15, the block look ahead carry generate signals BG11 and BG15, and the inverted real carry signal $\overline{C7}$ which is supplied from the circuit of FIG. 22A. Then the circuit BLA2 generates the inverted real carry signals $\overline{C11}$ and $\overline{C15}$. The circuit BLA2 consists of a block look ahead carry generate circuit BLACG(2) such as the circuit BLACG used in the third embodiment (FIGS. 16, 19A–19C), and a multiplexer MPX2(2) such as the multiplexer MPX2 used in the third embodiment (FIGS. 16, 20A, 20B).

Figure 22C:
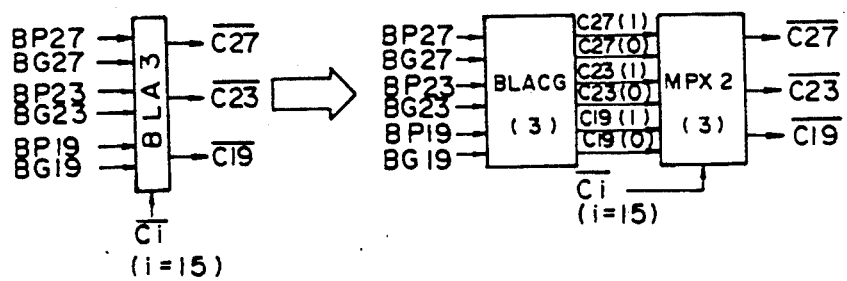

FIG. 22C shows the structure of the block look ahead carry generate circuit BLA3, which relates to the sixteenth digit to the twenty-seventh digit. The circuit BLA3 is supplied with the block look ahead carry propagate BP19, BP23, and BP27, block look ahead carry generate signals BG19, BG23, and BG27, and the inverted real carry signal $\overline{C15}$, which is supplied from the circuit BLA2 of FIG. 22B. Then, the circuit BLA3 generates the inverted real carry signals $\overline{C19}$, $\overline{C23}$ and $\overline{C27}$. The circuit may be constructed by a block look ahead carry generate circuit BLACG(3) and a multiplexer MPX2(3) as in the case of the circuit BLA2 of FIG. 22B.

Figure 22D:
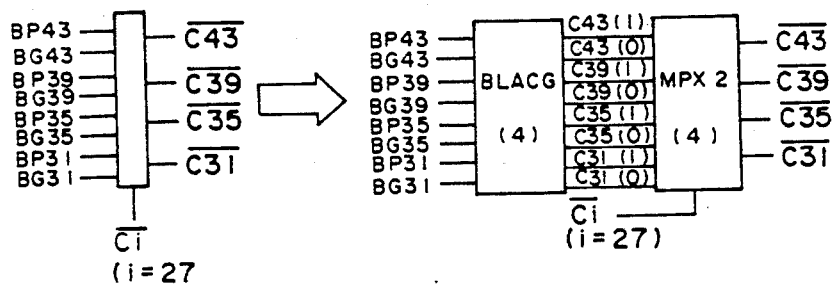

FIG. 22D shows the structure of the block look ahead carry generate circuit BLA4, which relates to the twenty-eighth digit to the fourty-third digits. The circuit BLA4 is supplied with the block look ahead carry propagate signals BP31, BP35, BP39 and BP43, the block look ahead carry generate signals BG31, BG35, BG39 and BG43, and the inverted real carry signal $\overline{C27}$, which is supplied from the circuit BLA3 of FIG. 22C. Then, the circuit BLA4 generates the inverted real carry signals $\overline{C31}$, $\overline{C35}$, $\overline{C39}$ and $\overline{C43}$. The circuit may be constructed by a block look ahead carry generate circuit BLACG(4) and a multiplexer MPX(4) as in the case of the circuit BLA2 of FIG. 22B.

Figure 22E:
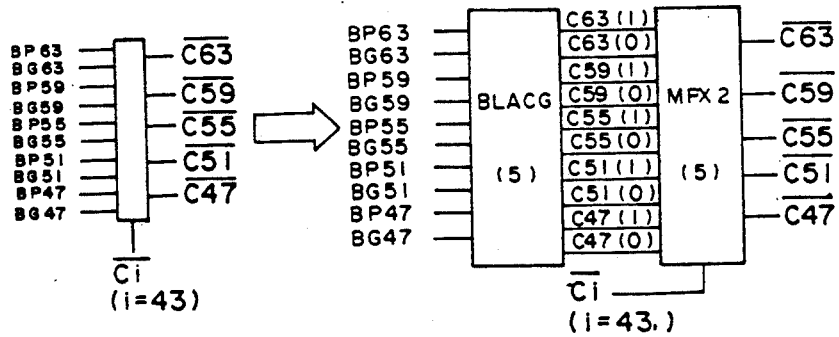

FIG. 22E shows the structure of the block look ahead carry generate circuit BLA5, which relates to the fourty-fourth digit to the sixty-third digit. The circuit BLA5 is supplied with the block look ahead carry propagate signals BP47, BP51, BP55, BP59 and BP63, block look ahead carry generate signals BG47, BG51, BG55, BG59 and BG63, and the inverted real carry signal $\overline{C43}$, which is supplied from the circuit BLA4 of FIG. 22D. Then, the circuit BLA5 generates the inverted real carry signals $\overline{C47}$, $\overline{C51}$, $\overline{C55}$, $\overline{C59}$ and $\overline{C63}$. The circuit may be constructed by a block look ahead carry generate circuit BLACG(5) and a multiplexer MPX(5) as in the case of the circuit BLA2 of FIG. 22B.

In operation, the circuit BLA0 is supplied with the aforementioned signals BG3, BP3, BG7, BP7 and $C_{IN}$, and generates the inverted real carry signals $\overline{C3}$ and $\overline{C7}$. The inverted real carry signal $\overline{C3}$ and the inverted real carry signal $\overline{C_{IN}}$ (FIG. 21) are used for determining the real sum signals F0 through F3 by selecting, in the corresponding multiplexer MPX1, one of two sets of provisional sum signals F0(1)–F3(1) and F0(0)–F3(0) supplied from the corresponding partitioned adder CSA. Likewise, the real sum signals F4 through F7 are determined. The inverted real carry signal $\overline{C7}$ is used for determining the corresponding real sum signals by selection, and is also served as a signal for determining inverted real carry signals relating to higher-order digits. In this way, provisional sum signals and provisional carry signals are calculated beforehand, and real sum signals and real carry signals are immediately determined when the inverted real carry signal is propagated from the lower-order digit.

The fourth embodiment is faster than the aforementioned third embodiment of FIG. 16 by a delay time amounting to two stages of logic gates.

Figure 23:
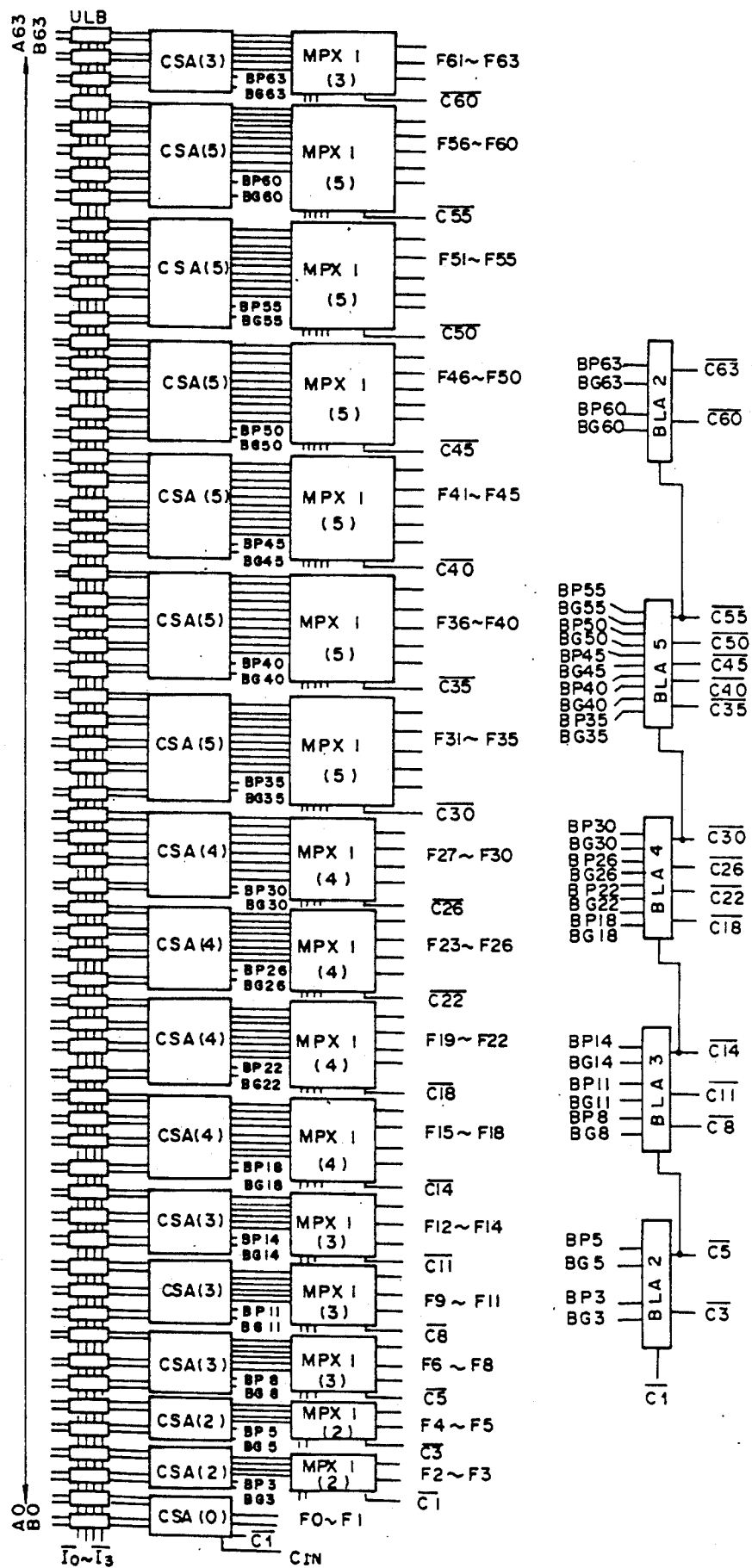
FIG. 23 is a view illustrating a fifth embodiment of the present invention.

A description is given of a fifth embodiment of the present invention. The essential feature of the fifth embodiment is that the number of digits to be processed in partitioned adders and multiplexers is increased towards the highest-order digit. Referring to FIG. 23, partitioned adders CSA(f) (f=2, 3, 4, 5 in the illustrated embodiment) simultaneously processes f digits. As shown, the fifth embodiment includes a partitioned adder CSA0, two partitioned adders CSA(2), three partitioned adders CSA(3), four partitioned adders CSA(4), and six partitioned adders CSA(5). Further, one partitioned adder CSA(3) is provided with respect to the sixty-first digit to the sixty-third digit.

Multiplexers MPX1(f), which simultaneously process f digits, are provided with respect to corresponding partitioned adders CSA(f). The fifth embodiment includes two multiplexers MPX1(2), three multiplexers MPX1(3), four multiplexers MPX1(4), and six multiplexers MPX1(5). Further, one multiplexer MPX1(3) is provided with respect to the sixty-first digit to the sixty-third digit. The partitioned adder CSA0 is the same as the partitioned adder CSA0 shown in FIG. 5. Block look ahead carry generate circuits BLA2, BLA3, BLA4 and BLA5 are the same as corresponding circuits shown in FIG. 21 and FIGS. 22B through 22E. Further, one multiplexer MPX1(3) is provided with respect to the sixty-first digit to the sixty-third digit.

Figure 24A:
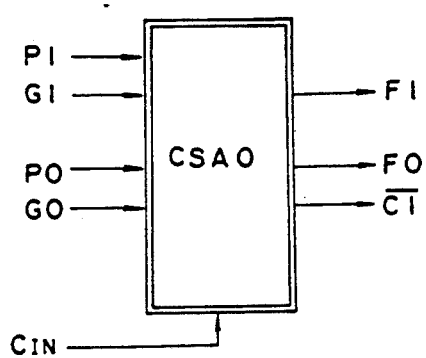
FIGS. 24A and 24B are views illustrating an partitioned adder used in the fifth embodiment.
Figure 24B:
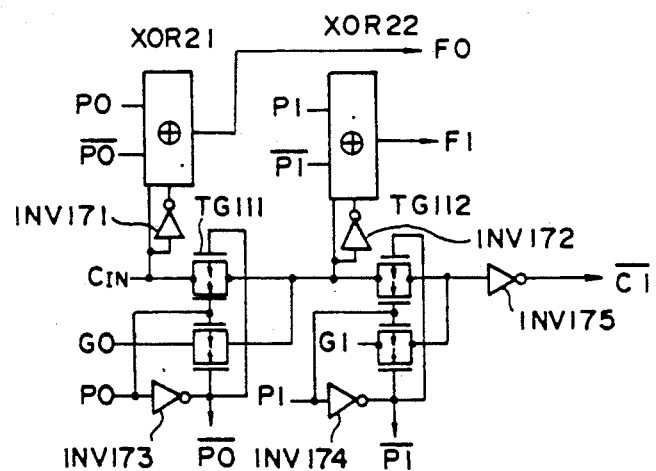

FIG. 24A and 24B illustrate the structure of the partitioned adder CSA0. As depicted, the partitioned adder CSA0 is provided with the carry propagate signals P0 and P1, the carry generate signals G0 and G1, and the real carry signal $C_{IN}$ propagated from the digit which is one digit lower than the lowest-order digit. The partitioned adder CSA0 is made up of two exclusive-OR gates XOR21 and XOR22, two transfer gates TG111 and TG112, and five inverters INV171 through INV175.

In operation, the second and third digits, and the fourth and fifth digits are processed in the corresponding partitioned adders CSA(2) and multiplexers MPX1(2). The circuit BLA2 is provided with the block look ahead carry propagate signals BP3 and BP5, the block look ahead carry generate signals BG3 and BG5, and the inverted real carry signal $\overline{C1}$ propagated from the lower-order digit, which are necessary to generate the inverted real carry signals $\overline{C3}$ and $\overline{C5}$. Responsive to the inverted real carry signal $\overline{C1}$, the inverted real carry signals $\overline{C3}$ and $\overline{C5}$ are simultaneously generated by the circuit BLA2. It takes a delay time of 3D after the carry propagate signals Pj and the carry generate signals Gj are generated. As described previously, D is a unit delay time taken for a signal to pass through a transfer gate.

The block look ahead carry propagate and generate signals BPi and BGi to be propagated to higher-order digits are designed to be output when the corresponding inverted real carry signals $\overline{Ci}$ are supplied from lower-order digits. This is done by designing higher partitioned adders to process an increased number of digits. In this way, the provisional sum signals Fj(1) and Fj(0) relating to the second digit to the eighth digit are obtained with a delay time of 4D, and the provisional sum signals Fj(1) and Fj(0) relating to the ninth digit to the eighteenth digit are obtained with a delay time of 5D. Further, the provisional sum signals Fj(1) and Fj(0) relating to the nineteenth digit to the thirty-fifth digit are obtained with a delay time of 7D, and the provisional sum signals Fj(1) and Fj(0) relating to the thirty-sixth digit to the sixtieth digit are obtained with a delay time of 7D. Moreover, the provisional sum signals Fj(1) and Fj(0) relating to the sixty-first digit to the sixty-third digit are obtained with a delay time of 8D. It can be seen from the above that the fifth embodiment presents further increased processing speed. The fifth embodiment is 2D faster than the aforementioned fourth embodiment. As a result, the fifth embodiment is the fastest. On the other hand, the fifth embodiment does not have the regularity of arrangement of partitioned adders CSA(f) and multiplexers MPX1(f), which requires partitioned adders and multiplexers which process different digits.

The aforementioned multiplexers may be constructed by NMOS, PMOS, other metal-insulator-semiconductor transistors, MESFETs, HEMTs, or bipolar devices as the transfer gates can be replaced with the logic gate equivalent to the selector in FIG. 7A using these devices.

The present invention is not limited to the embodiments, and variations and modification may be made without departing from the scope of the invention.

What is claimed is:

1. An operation circuit for M-bit parallel full addition, comprising:

N partitioned adders provided for every n bits ($n < M$; $N \geq M/n$), each generating a pair of provisional carry signals $C_{ns-1}(1)$ and $C_{ns-1}(0)$ and real sum signals Fj each having n bits ($n(s-1) \leq j \leq n2-1$) related to the s-th ($1 \leq s \leq N$) partitioned adder, said paired provisional carry signals being calculated supposing a first case where a carry signal (carry-out) of a lower-order bit (($n(s-1)-1$)th bit) is "1" and a second case where the carry signal of said lower-order bit is "0"; and means for generating a real carry signal $C_{ns-1}$ (carry-out of the (ns−1)th bit) and a pair of provisional carry signals $C^*_{ns-1}(1)$ and $C^*_{ns-1}(0)$, said means for generating comprising:

a plurality of first means for selecting one of provisional carry signals $C_{ns-1}(1)$ and $C_{ns-1}(0)$ supplied from an s-th partitioned adder, depending on the value of the real carry signal $C_{n(s-1)-1}$ supplied from said (s−1)th partitioned adder being "1" or "0", respectively, said selected one of said provisional carry signals being the real carry signal $C_{ns-1}$ to be propagated from said s-th partitioned adder;

a plurality of second means for generating a pair of provisional carry signals $C^*_{ns-1}(1)$ and $C^*_{ns-1}(0)$ by selecting either one of said provisional carry signals $C_{ns-1}(1)$ and $C_{ns-1}(0)$, depending on the provisional carry signals $C^*_{n(s-1)-1}(1)$ and $C^*_{n(s-1)-1}(0)$ propagated from said second means relating to the ($n(s-1)-1$)th bit, or depending upon said provisional carry signals $C_{n(s-1)-1}(1)$ and $C_{n(s-1)-1}(0)$ propagated from said (s−1)th partitioned adder, $C_{ns-1}(1)$ or $C_{ns-1}(0)$ being selected as $C^*_{ns-1}(1)$ depending on the value of $C^*_{n(s-1)-1}(1)$ or $C_{n(s-1)-1}(1)$ being "1" or "0" respectively, and $C_{ns-1}(1)$ or $C_{ns-1}(0)$ being selected as $C^*_{ns-1}(0)$ depending upon the value of $C^*_{n(s-1)-1}(0)$ or $C_{n(s-1)-1}(0)$ being "1" or "0", respectively; and a plurality of third means, used alternately with said first means in combination with said second means, for generating said real carry signal $C_{ns-1}$ by selecting $C^*_{ns-1}(1)$ or $C^*_{ns-1}(0)$ generated by said second means and related to said (ns−1)th bit, if said real carry signal $C_{ms-1}$ ($0 < m < n$) propagated from one of said first and third means relating to said lower-order bit (($ms-1$)th bit) is "1" or "0", respectively; and said first means relating to said (ns−1)th bit and l pairs ($0 < l < N$) of said second and third means relating to a ($n(s+1)-1$)th, ($n(s+2)-1$)th, . . . , and ($n(s+l)-1$)th bit, generating ($l+1$) real carry signals $C_{ns-1}$, $C_{n(s+1)-1}$, $C_{n(s+2)-1}$, . . . , and $C_{n(s+l)-1}$ at the same time depending on the real carry signal $C_{n(s-1)-1}$ relating to the ($n(s-1)-1$)th bit, $C_{ns-1}(1)$, $C^*_{n(s+1)-1}(1)$, $C^*_{n(s+2)-1}(1)$, . . . , and $C^*_{n(s+l)-1}(1)$ are selected as the respective real carry signals if $C_{n(s-1)-1}$ is "1", and $C_{ns-1}(0)$, $C^*_{n(s+1)-1}(0)$, $C^*_{n(s+2)-1}(0)$, . . . , and $C^*_{n(s+l)-1}(0)$ are selected as respective real carry signals when $C_{n(s-1)-1}$ is "0".

2. An operation circuit as claimed in claim 1, wherein each of said partitioned adders is a 4-bit partitioned adder ($n=4$), and each of said first means comprise a plurality of first multiplexers, each of said second means comprise a plurality of second and third multiplexers, and each of said third means comprise a plurality of fourth multiplexers;

said first multiplexer relating to a seventh bit selects one of a pair of provisional carry signals C7(1) and C7(0) propagated from said second partitioned adder, depending on the real carry signal C3 propagated from said first partitioned adder which includes four series connected ripple-carry adders, for generating a real carry signal C7 relating to the seventh bit which is supplied to said first multiplexer relating to the 11th bit and said fourth multiplexer relating to the 15th bit, wherein said first multiplexer relating to the 11th bit selects one of a pair of provisional carry signals C11 (1) and C11 (0) propagated from said third partitioned adder to generate a real carry signal C11 depending on the value of the real carry signal C7 propagated from said first multiplexer relating to the seventh bit, wherein said second and third multiplexers, relating to the 15th bit, generate a pair of provisional carry signals C15*(1) and C15*(0) by using a pair of provisional carry signals C11(1) and C11(0) propagated from said third partitioned adder and a pair of provisional carry signals C15(1) and C15(0) propagated from said fourth partitioned adder, and wherein said fourth multiplexer relating to the 15th bit generates a real carry signal C15 when the real carry signal C7 of the second partitioned adder is generated.

3. An operation circuit as claimed in claim 2, wherein a pair of provisional carry signals C19(1) and C19(0) supplied from said fifth partitioned adder being input to said first multiplexer relating to a 19th bit and said second and third multiplexers relating to a 23rd bit, wherein said second and third multiplexers generate a pair of provisional carry signals C23*(1) and C23*(0) depending upon the provisional carry signals C19(1) and C19(0), respectively, supplied from said fifth partitioned adder and a pair of provisional carry signals C23(1) and C23(0) supplied from said sixth partitioned adder, said provisional carry signals C23*(1) and C23*(0) being supplied to said second and third multiplexers relating to a 27th bit to generate C27*(1) and C27*(0), respectively, in combination with a pair of provisional carry signals C27(1) and C27(0) output from said seventh partitioned adder, and wherein said fourth multiplexers relating to the 23rd and 27th bits and said first multiplexer relating to the 19th bit generate real carry signals C23, C27, and C19, respectively, when said real carry signal C15 relating to the 15th bit is generated.

4. An operation circuit as claimed in claim 1, wherein said first means relating to the (ns−1)th bit comprises:
a selector for selecting an inverted signal of either one of said provisional carry signal $C_{ns-1}(1)$ or $C_{ns-1}(0)$, propagated from said s-th partitioned adder; and
an inverter, operatively connected to said selector, through which the selected signal passes, and wherein said inverter outputs said real carry signal $C_{ns-1}$.

5. An operation circuit as claimed in claim 4, wherein said selector comprises a pair of transfer gates.

6. An operation circuit as claimed in claim 1, wherein said second means relating to the (ns−1)th bit comprises:
a first selector for selecting either one of said provisional carry signals $C_{ns-1}(1)$ or $C_{ns-1}(0)$ propagated from said s-th partitioned adder, depending upon the value of said provisional carry signal $C_{n(s-1)}(1)$ propagated rom said (s−1)th partitioned adder;
a second selector for selecting either one of said provisional carry signals $C_{ns-1}(1)$ or $C_{ns-1}(0)$, depending upon the value of said provisional carry signal $C_{n(s-1)-1}(0)$ propagated from said (s−1)th partitioned adder; and
first and second inverters, operatively connected to said first and second selectors, through which selected signals output from said first and second selectors pass, respectively;
wherein said third means relating to the (ns−1)th bit comprises:
a third selector, operatively connected to said first and second inverters, for selecting one of the signals output from said first and second inverters; and
a third inverter, operatively connected to said third selector, through which said selected signal output from said third selector passes, the output signal from said third inverter being the real carry signal $C_{ns-1}$).

7. An operation circuit as claimed in claim 6, wherein said second means relating to the (ns−1)th bit further comprises fourth and fifth inverters connected to said first and second inverters, respectively, output signals from said fourth and fifth inverters are said provisional carry signals $C^*_{ns-1}(1)$ and $C^*_{ns-1}(0)$, respectively.

8. An operation circuit as claimed in claim 1, wherein each of said N partitioned adders comprises:
real sum generating means for generating real sum signals Fj having n bits, said real sum generating means including:
transfer gates; and
inverters respectively operatively connected to said transfer gates; and
provisional carry signal generating means for generating said pair of provisional carry signals $C_{ns-1}(1)$ and $C_{ns-1}(0)$.

9. An operation circuit as claimed in claim 1, wherein l increases toward the highest-order bit.

10. An operation circuit for M-bit parallel full addition, comprising:
N partitioned adders provided for every n bits (n<M; N≧M/n), each generating a pair of provisional carry signals $C_{ns-1}(1)$ and $C_{ns-1}(0)$ and a pair of provisional sum signals Fj(1) and Fj(0) each having n bits (n(s-1)≦j≦ns-1) relating to said s-th (1≦s≦N) partitioned adder, said paired provisional carry signals and said paired provisional sum signals being calculated supposing a first case where the carry signal (carry-out) of a lower-order bit ((n(s−1)−1)th) is "1" and a second case where the carry signal of said lower-order bit is "0"; and
means for generating a real carry signal $C_{ns-1}$ (carry-out of the (ns−1)th bit), real sum signals Fj having n bits and relating to said s-th partitioned adder (n(s-1)≦j≦ns-1) and a pair of provisional carry signals $C^*_{ns-1}(1)$ and $C^*_{ns-1}(0)$, said means comprising:
a plurality of first means for selecting one of $C_{ns-1}(1)$ and $C_{ns-1}(0)$ and selecting one of Fj(1) and Fj(0) having n bits and output from said s-th partitioned adder, depending on the value of the real carry signal $C_{n(s-1)-1}$ output from said (s−1)th partitioned adder being "1" or "0", respectively, said selected one of said provisional carry signals being the real carry signal $C_{ns-1}$ to be propagated from said s-th partitioned adder, said selected one of said provisional sum signals being the real sum signal Fj relating to the j-th bit;
a plurality of second means for generating a pair of provisional carry signals $C^*_{ns-1}(1)$ and $C^*_{ns-1}(0)$ by selecting either one of said provisional carry signals $C_{ns-1}(10$ and $C_{ns-1}(0)$, depending on the provisional carry signals $C^*_{n(s-1)-1}(1)$ and $C^*_{n(s-1)-1}(0)$ propagated from said second means relating to the (n(s−1)−1th bit, or depending upon said provisional carry signals $C_{n(s-1)-1}(1)$ and $C_{n(s-1)-1}(0)$ propagated from said (s−1)th partitioned adder, $C_{ns-1}(1)$ or $C_{ns-1}(0)$ being selected as $C^*_{ns-1}(1)$ depending upon the value of $C^*_{n(s-1)-1}(1)$ or $C_{n(s-1)-1}(1)$ being "1" and "0" respectively, and $C_{ns-1}(1)$ or $C_{ns-1}(0)$ being selected as $C^*_{ns-1}(0)$ depending upon the value of $C^*_{n(s-1)-1}(0)$ or $C_{n(s-1)-1}(0)$ being "1" and "0", respectively; and
a plurality of third means, alternately used with said first means in combination with said second means, for generating the real carry signal $C_{ns-1}$ by selecting $C^*_{ns-1}(1)$ or $C^*_{ns-1}(0)$ generated by said second means relating to the (ns−1)th bit, and for generating the real sum signals Fj having n bits by selecting Fj(1) or Fj(0) supplied from said s-th partitioned adder, depending on a real carry signal $C_{ms-1}$ (0<m≦n−1) propagated from said first or third means relating to the lower-order bit ((ms−1)th bit) being "1" or "0", respectively,
said first means relating to the (ns−1)th bit and l pairs (0≦l≦N) of said second and third means relating to the (n(s+1)−1)th, (n(s+2)−1)th, ... , and (n(s+l)−1)th bit, generating (l+1) real carry signals $C_{ns-1}$, $C_{n(s+1)-1}$, $C_{n(s+2)-1}$, ..., and $C_{n(s+l)-1}$ and real sum signals Fj including n(l+1)bits (n(s−1)≦j≦n(s+l)−1) at the same time depending upon the real carry signal $C_{n(s-1)-1}$ relating to the (n(s−1)−1)th bit, wherein $C_{ns-}$ 1(1), $C^*_{n(s+1)-1}(1)$, $C^*_{n(s+2)-1}(1)$, . . . , $C^*_{n(s+l)-1}(1)$ and Fj(1) are selected as the respective real carry and sum signals when $C_{n(s-1)-1}$ is "1" and $C_{ns-1}(0)$, $C^*_{n(s+1)-1}(0)$, $C^*_{n(s+2)-1}(0)$, . . . , $C^*_{n(s+l)-1}(0)$, and Fj(0) are selected as the respective real carry and sum signals when $C_{n(s-1)-1}$ is "0".

11. An operation circuit as claimed in claim 10, wherein each of said partitioned adders is a 4-bit partitioned adder (n=4), and said first means comprises a plurality of first multiplexers, said second means comprises a plurality of second and third multiplexers, and said third means comprises a plurality of fourth multiplexers, wherein said first multiplexer relating to the 4th–7th bits selects one of a pair of said provisional carry signals C7(1) and C7(0) and selects one of a pair of said provisional sum signals Fj(1) and Fj(0) (j=4–7), propagated rom said second partitioned adder, depending upon the value of the real carry signal C3 propagated from said first partitioned adder which comprises four series-connected ripple carry adders, for generating a real carry signal C7 relating to the seventh bit, which is supplied to said first multiplexer relating to the 8th–11th bits and said fourth multiplexer relating to the 12th–15th bits, and generating real sum signals $F_4$–$F_7$, wherein said first multiplexer relating to the 8th–11th bits selects one of a pair of said provisional carry signals C11(1) and C11(0) and selects one of a pair of said provisional sum signals Fj(1) and Fj(0) (j=8–11) propagated from the third partitioned adder, to generate a real carry signal C11 and real sum signals $F_8$–$F_{11}$, depending upon the value of the real carry signal C7 propagated from said first multiplexer relating to the seventh bit, wherein said second and third multiplexers relating to the 15th bit, generate a pair of provisional carry signals C15*(1) and C15*(0) by using a pair of said provisional carry signals C11(10 and C11(0) propagated from said third partitioned adder and a pair of said provisional carry signals C15(1) and C15(0) propagated from said fourth partitioned adder, wherein said fourth multiplexer relating to the 12th–15th bits generates a real carry signal C15 by selecting said provisional carry signal C15*(1) or C15*(0) output from said second and third multiplexers relating to the 15th bit, and generates the sum signals $F_{12}$–$F_{15}$ by selecting said provisional sum signal Fj(1) or Fj(0) (j=12–15) supplied from said fourth partitioned adder, respectively, when the real carry signal C7 of said second partitioned adder is generated.

12. An operation circuit as claimed in claim 11, wherein a pair of provisional carry signals C19(1) and C19(0) output from said fifth partitioned adder is input to said first multiplexer relating to the 16th–19th bits and to said second and third multiplexers relating to the 20th–23rd bits, wherein said second and third multiplexers relating to the 23rd bit generate a pair of provisional carry signals C23*(1) and C23*(0) depending on said provisional carry signal C19(1) or C19(0), respectively, output from said fifth partitioned adder and a pair of provisional carry signals C23(1) and C23(0) output from said sixth partitioned adder, said provisional carry signals C23*(1) and C23*(0) being input to said second and third multiplexers relating to the 24th–27th bits to generate C27*(1) and C27*(0), respectively, in combination with a pair of provisional carry signals C27(1) and C27(0) supplied from said seventh partitioned adder, wherein said first multiplexer relating to the 16th–19th bits and sid fourth multiplexers relating to the 20th–23rd and 24th–27th bits generate real carry signals C19, C23 and C27, and real sum signals $F_{16}$–$F_{19}$, $F_{20}$–$F_{23}$, and $F_{24}$–$F_{27}$, respectively, when said real carry signal C15 relating to the 15th bit is generated.

13. An operation circuit as claimed in claim 10, wherein said first means relating to the n(s−1)th through (ns−1)th bits comprises:

first selector means for selecting an inverted signal of either said provisional carry signal $C_{ns-1}(1)$ or $C_{ns-1}(0)$ propagated from said s-th partitioned adder;

a first inverter, operatively connected to said first selector means, through which the selected provisional carry signal passes and outputting said real carry signal $C_{ns-1}$;

second selector means for selecting an inverted signal of either one of said provisional sum signals Fj(1) and Fj(0) (n(s−1)<j<ns−1) propagated from said s-th partitioned adder; and second inverters, operatively connected to said second selector means, through which the selected provisional sum signals pass and outputting said real sum signals $F_{n(s-1)}$ through $F_{ns-1}$.

14. An operation circuit as claimed in claim 10, wherein said second means relating to the (ns-1)th bit comprises:

first selector means for selecting either one of said provisional carry signals $C_{ns-1}(1)$ or $C_{ns-1}(0)$ propagated from said s-th partitioned adder, depending upon the value of said provisional carry signal $C_{n(s-1)-1}(1)$, propagated from said (s−1)th partitioned adder; and second selector means for selecting either one of said provisional carry signals $C_{ns-1}(1)$ and $C_{ns-1}(0)$, depending upon the value of said provisional carry signal $C_{n(s-1)-1}(0)$, propagated from said (s-1)th partitioned adder;

first and second inverters, operatively connected to said first and second selector means, through which selected signals output from said first and second selectors pass, respectively, wherein said third means relating to the (n(s−1)−1)th to (ns-1)th bits comprises:

third selector means, operatively connected to said first and second inverters, for selecting one of the signals output from said first and second inverters;

a third inverter, operatively connected to said third selector means, for receiving the selected signal output from said third selector means and outputting said real carry signal $C_{ns-1}$;

fourth selector means for selecting either one of said provisional sum signals Fj(1) or Fj(0) (n(s−1)≦j≦ns−1) including n bits propagated from said s-th partitioned adder; and fourth inverters, operatively connected to said fourth selector means, for receiving the selected signals from said fourth selector means and outputting the real sum signals $F_{n(s-1)}$ through $F_{ns-1}$.

15. An operation circuit as claimed in claim 14, wherein said second means relating to the (ns−1)th bit further comprises:

fifth and sixth inverters, connected to said first and second inverters, respectively, and outputting provisional carry signals $C^*_{ns-1}(1)$ and $C^*_{ns-1}(0)$, respectively.

16. An operation circuit as claimed in claim 10, wherein l increases toward the highest-order bit.

17. An operation circuit for M-bit parallel full addition, comprising:

N partitioned adders, N being greater than or equal to one, the kth adder processing a corresponding number of bits $n_k$ ($1 \leq k \leq N$) relating to the $(1-n_k+1)$th through q−th bit ($q = n_1 + n_2 n_3 ... + n_k - 1$), and comprising:

a plurality of first through fourth means, said first means generating a pair of provisional carry signals $C_j(1)$ and $C_{j(0)}$ ($e+1 \leq j \leq q-1$, $e = 1 - nk$);

said second means generating a pair of provisional sum signals Fj(1) and Fj(0) (($e+1$) $\leq j \leq q$) having $n_k$ bits during a first case where a carry-in signal $C_e$ input to one of said partitioned adders is "1" and during a second case where said carry-in signal is "0";

said third and fourth means generating a block look-ahead carry propagate signal BPq and a block look-ahead carry generate signal BGq relating to the q-th bit;

in said N first means, the kth first means selecting either one of said paired provisional sum signals Fj(1) and Fj(0) supplied from said kth partitioned adder depending upon the value of said carry-in signal $C_e$ and producing real sum signals Fj having $n_k$ bits ($e+1 \leq j \leq q$);

in said R second means ($1 \leq R < N$), the rth second means ($1 \leq r \leq R$) generating a pair of provisional carry signals $C_{qr(j)}(1)$ and $C_{qr(j)}(0)$, each having $m_r$ bits ($1 \leq m_r < N$) relating to the qr(1)-th through qr($m_r$)-th bits, during a first case where the carry-in signal $C_u$ input to said second means (u<qr(1)) is "1" and during a second case where said carry-in signal $C_u$ is "0" by employing said block look ahead carry generate signals BGqr(1), BGqr(2) ... , BGqr(j), wherein j=1, 2, 3, ..., $m_r$ and qr(j) is a q-value related to said third and fourth means of said partitioned adder related to the qr(j)-th bit;

in said R third means, the r-th ($1 \leq r \leq R$) third means generating real carry signals $C_{qr(j)}$ or inverted real carry signals $XC_{qr(j)}$ ($1 \leq j \leq m_r$) relating to the qr(j)-th bit having $m_r$ bits, by selecting one of said paired provisional carry signals $C_{qr(j)}(1)$ and $C_{qr(j)}(0)$ input from said r-th second means, depending upon the value of said real carry signal propagated from said (r−1)th third means, said selected one of said paired provisional carry signals relating to the qr(j)-th bit input to said first means relating to the (qr(j)+1)-th through qr(j+1)th bits for generating real sum signals Fj, and said selected real carry signal or said inverted real carry signal relating to the qr($m_r$)-th bit being supplied to said (r+1)th third means for generating real carry signals having higher-order bits;

each of said first through third means and said partitioned adders comprising transfer gates and inverters;

each of said transfer gates receiving corresponding input signals and outputting one of said corresponding input signals; and each of said inverters being coupled to a corresponding one of said transfer gates and inverting said one of said corresponding input signals output by said corresponding one of said transfer gates.

18. An operation circuit as claimed in claim 17, wherein said number of bits ($m_r$) included in each of said second means increases toward the highest-order bit.

19. An operation circuit as claimed in claim 17, wherein the number of bits ($m_r$) included in each of said second means is identical to each other.

20. An operation circuit as claimed in claim 17, wherein the number of bits ($n_k$) to be processed in each of said partitioned adders is equal to each other.

21. An operation circuit as claimed in claim 17, wherein the number of bits ($n_k$) to be processed in each of said partitioned adders increases toward the highest-order bit.

* * * * *

UNITED STATES PATENT AND TRADEMARK OFFICE
CERTIFICATE OF CORRECTION

PATENT NO. : 5,047,976

DATED : September 10, 1991

INVENTOR(S) : Gensuke Goto, et al.

It is certified that error appears in the above-identified patent and that said Letters Patent is hereby corrected as shown below:

TITLE PAGE, after section [63] insert the following:

--[30] Foreign Application Priority Data

March 25, 1988 [JP] Japan .... 63-72635--;

[57] ABSTRACT line 12, "n(s+1)-1) by" should be --n(s+$l$)-1) by--;
line 16, "generate 1" should be --generate $l$--.

Col. 6, line 6, "vies" should be --views--.

Col. 23, line 34, "n2-1)" should be --ns-1)--

Col. 25, line 32, "rom" should be --from--.

Col. 26, line 36, "$C_{ns-1}(10$" should be --$C_{ns-1}(1)$--.

Col. 29, line 15, "(1-$n_k$+1)th" should be --(q-$n_k$+1)th--;

UNITED STATES PATENT AND TRADEMARK OFFICE
CERTIFICATE OF CORRECTION

PATENT NO. : 5,047,976

DATED : September 10, 1991

INVENTOR(S) : Gensuke Goto, et al.

It is certified that error appears in the above-identified patent and that said Letters Patent is hereby corrected as shown below:

Col. 29, line 19, "e=1-nk);" should be --e=q-$n_t$);--.

Signed and Sealed this

Eighteenth Day of May, 1993

Attest:

MICHAEL K. KIRK

Attesting Officer          Acting Commissioner of Patents and Trademarks